United States Patent [19]
Murphy et al.

[11] Patent Number: 5,845,485
[45] Date of Patent: Dec. 8, 1998

[54] METHOD AND APPARATUS FOR INJECTING HYDROGEN INTO A CATALYTIC CONVERTER

[75] Inventors: Oliver J. Murphy, Bryan; Craig Andrews, College Station, both of Tex.

[73] Assignee: Lynntech, Inc., College Station, Tex.

[21] Appl. No.: 682,024

[22] Filed: Jul. 16, 1996

[51] Int. Cl.⁶ ................................................. F01N 3/00
[52] U.S. Cl. ........................ 60/274; 60/284; 60/286; 60/320; 237/12.3 R
[58] Field of Search ................... 123/1 A, DIG. 12; 237/12.3 R; 60/320, 284, 286, 274; 422/172

[56] References Cited

U.S. PATENT DOCUMENTS

| | | |
|---|---|---|
| 3,311,097 | 3/1967 | Mittelstaedt . |
| 3,420,052 | 1/1969 | Miller ........................................ 60/320 |
| 3,719,457 | 3/1973 | Nagamatsu ................................ 60/299 |
| 3,729,936 | 5/1973 | De Palma et al. ........................ 60/301 |
| 3,761,229 | 9/1973 | Schwartz .................................... 60/286 |
| 3,779,014 | 12/1973 | Nohira et al. ............................. 60/286 |
| 3,782,115 | 1/1974 | Johnson ..................................... 60/274 |
| 3,815,337 | 6/1974 | Lenane ....................................... 60/299 |
| 4,332,219 | 6/1982 | Gonzalez .................................. 123/1 A |
| 4,499,864 | 2/1985 | Lovercheck et al. ........................ 123/3 |
| 4,685,430 | 8/1987 | Ap ..................................... 123/142.5 R |
| 4,763,610 | 8/1988 | Thomas ........................................ 123/3 |
| 4,865,818 | 9/1989 | Merry et al. .............................. 60/299 |
| 4,939,902 | 7/1990 | Retallick ................................... 62/46.2 |
| 4,985,210 | 1/1991 | Minami .................................... 422/169 |
| 5,130,109 | 7/1992 | Wan ....................................... 423/213.2 |
| 5,155,995 | 10/1992 | Kinnear et al. ........................... 60/274 |
| 5,163,290 | 11/1992 | Kinnear .................................... 60/274 |
| 5,184,462 | 2/1993 | Schatz ........................................ 60/274 |
| 5,207,734 | 5/1993 | Day et al. ................................. 60/278 |
| 5,216,880 | 6/1993 | Aoki et al. ................................ 60/276 |
| 5,259,190 | 11/1993 | Bagley et al. ............................. 60/300 |
| 5,263,318 | 11/1993 | Oota et al. ................................ 60/284 |
| 5,419,121 | 5/1995 | Sung et al. ................................ 60/274 |

FOREIGN PATENT DOCUMENTS

| | | |
|---|---|---|
| 2227769 | 11/1974 | France .................................... 422/172 |
| 2 387 357 | 11/1978 | France . |
| 2246218 | 3/1974 | Germany . |
| 41 03 668 A1 | 3/1992 | Germany . |
| P 41 03 668.9 | 8/1992 | Germany . |
| 44 20 715 A1 | 1/1995 | Germany . |
| 4318214 | 11/1992 | Japan . |
| 6033748 | 2/1994 | Japan . |
| 93/06850 | 1/1993 | WIPO . |

OTHER PUBLICATIONS

Youji Kanada, Masaharu Hayasi, Motonobu Akaki, and Shunzou Tsuchikawa, "Hydrogen Added After–Burner System, " 1996, pp. 89–94.

Primary Examiner—Noah P. Kamen
Attorney, Agent, or Firm—Patterson & Streets, L.L.P.

[57] ABSTRACT

The present invention provides a method and apparatus for chemically heating by feeding hydrogen to a catalyst. The invention also provides a method and apparatus for thermally conditioning a catalyst in order to enhance the conversion of unacceptable emissions emanating from an internal combustion engine into water and other acceptable emissions. In one aspect of the invention, hydrogen is supplied from an electrolyzer or other hydrogen source and injected into the monolith of a catalytic converter to more rapidly bring the catalyst to a light-off temperature.

17 Claims, 19 Drawing Sheets

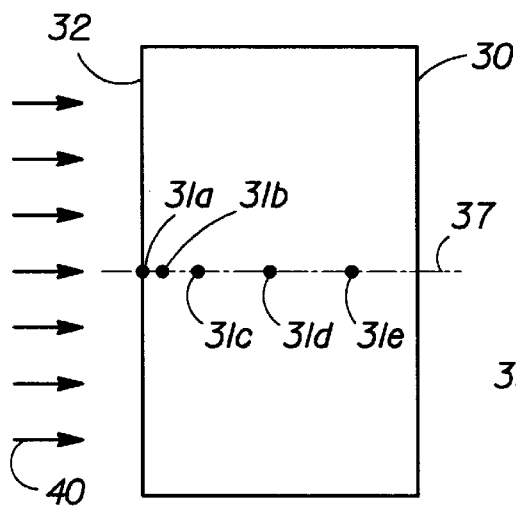
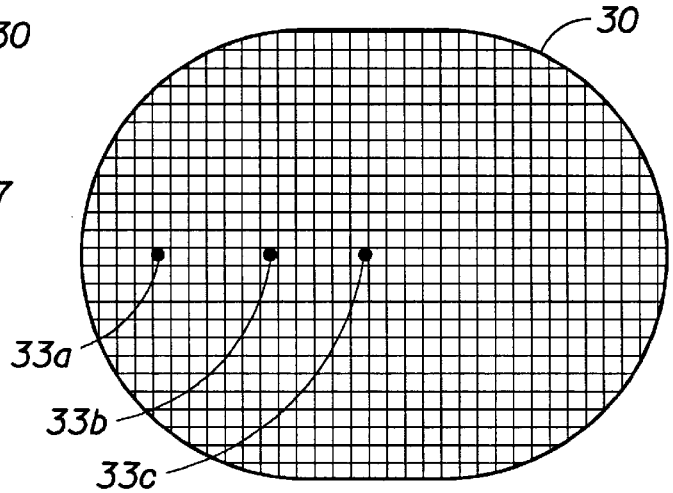
FIG. 4          FIG. 5
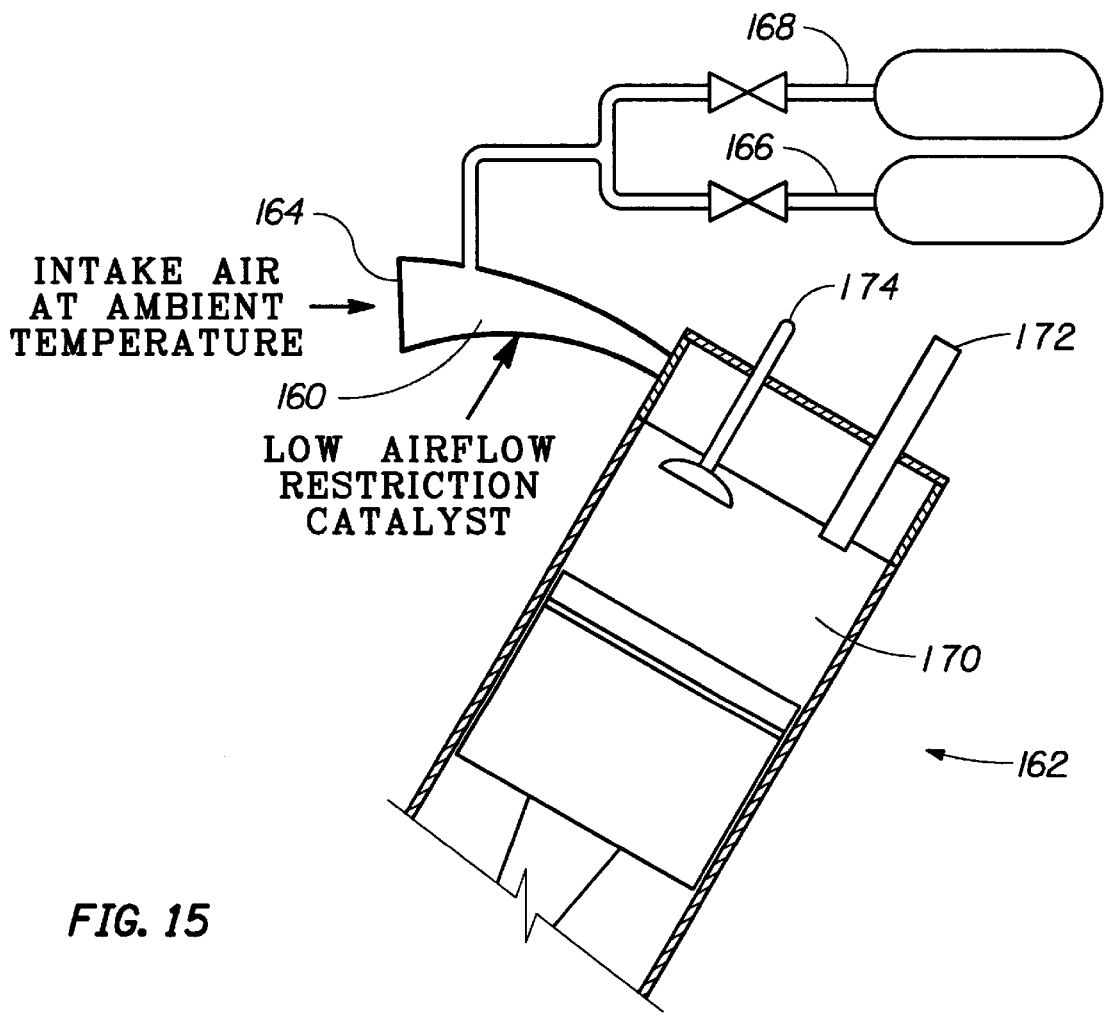
FIG. 15

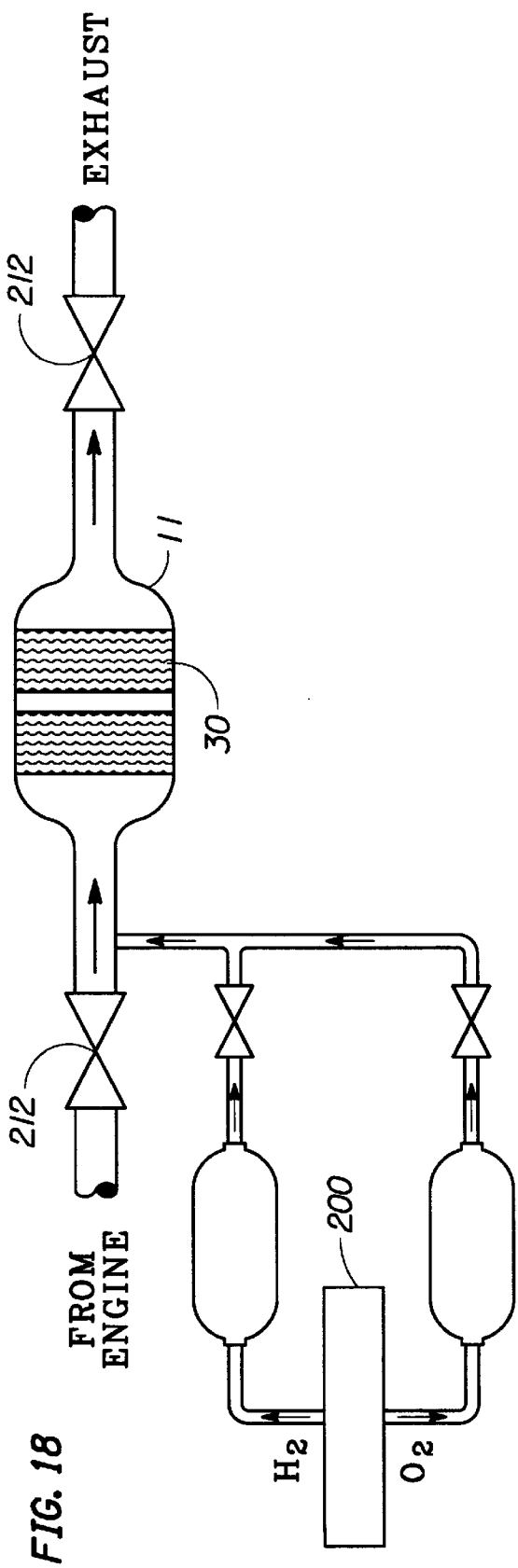
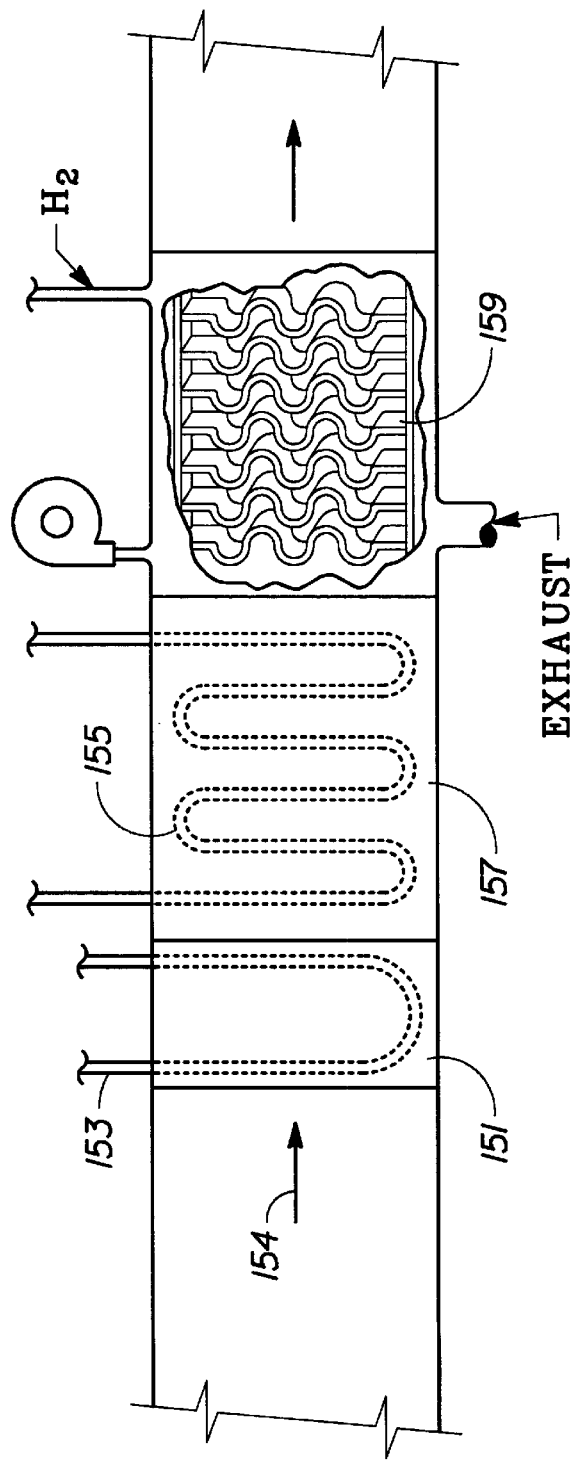
FIG. 18
FIG. 21

Modes of Operation for an Ideal CHC System

PRE-START
- Safety monitoring
- System status
- Sleep

START
- System status
- Converter temperature

PRE-HEAT
- Start air pump
- Release $H_2$ until:
  - time
  - temperature
  - volume (pressure)
- Safety monitoring
- System status

FIG. 20

REST
- Safety monitoring
- System status

RESTORE $H_2$ SUPPLY
- Electrolyze
- Control current draw
- Safety monitoring
- System status
- Monitor:
  - Pressure
  - Temperature SYSTEM MAINTENANCE
- Recover cathode water
- System status
- Safety monitoring

RETURN TO PRE-START

METHOD AND APPARATUS FOR INJECTING HYDROGEN INTO A CATALYTIC CONVERTER

BACKGROUND OF THE INVENTION

1. Field of the Invention

The present invention relates generally to the field of catalysis for the reduction of emissions from internal combustion engines. More particularly, the present invention relates to a method and apparatus for heating a catalyst by spontaneous combustion of hydrogen introduced into the catalyst. More particularly still, the present invention relates to the conditioning through preheating of a standard three-way or two-way catalytic monolith in a vehicle powered by an internal combustion engine, such as an automobile.

2. Background of the Related Art

The control and suppression of unwanted emissions created by the operation of an internal combustion engine is a primary consideration for engine designers and vehicle manufacturers because of nearly world-wide governmental requirements regarding acceptable emissions levels. Over eighty percent (80%) of the unacceptable emissions or pollutants created by internal combustion engines equipped with catalytic converters occur during cold start operations. These pollutants are emitted for a period of one to three minutes after cold engine starting, in large part because that is the time period required for the catalyst to reach an effective and efficient operating temperature. Therefore, even though the engine exhaust is flowing through the catalytic converter, until the exhaust heats the catalytic converter to its operating range from engine start up, the exhaust gases are only slightly catalyzed during that time period.

In order to meet governmental emission standards for internal combustion engine exhaust, a catalytic converter is located in the exhaust stream of the engine. The converter typically includes a canister holding a suitable catalyst, such as a three-way catalytic converter (TWC) catalyst monolith, that will oxygenate unburned, unacceptable components in the exhaust stream including hydrocarbons (HC), their partially oxidized derivatives such as aldehydes and carbon monoxide (CO), and at the same time reducing nitrogen oxides ($NO_x$), after almost stoichiometric fuel burn with oxygen in the cylinders of the engine. The exhaust gas is passed through the catalyst monolith, thereby completing the oxygenation of unburned HC and CO, and the reduction of $NO_x$ in the exhaust to convert these unacceptable emissions into acceptable emissions. Certain unacceptable emissions in the exhaust stream, including unburned hydrocarbons and carbon monoxide, require an oxidation reaction to destroy them so that they end up as the corresponding oxides, e.g., water and carbon dioxide. On the other hand, $NO_x$ requires a reduction reaction to develop $N_2$ and $O_2$. In fact, the $O_2$ product of this reduction contributes to the oxidation of the HC and CO in the exhaust.

TWC catalysts are currently formulated and designed to be effective over a specific operating range of both lean and rich fuel/air conditions and a specific operating temperature range. These particulate catalyst compositions enable optimization of the conversion of HC, CO, and $NO_x$. This purification of the exhaust stream by the catalytic converter is dependent on the temperature of the exhaust gas and the catalytic converter works optimally at an elevated temperature, generally at or above about 300° C. The time span between when the exhaust emissions begin (i.e., "cold start"), until the time when the substrate heats up sufficiently for the catalyst to work efficiently, is generally referred to as the light-off time. Light-off temperature is generally defined as the temperature at which fifty percent (50%) of the emissions from the engine are being converted as they pass through the catalyst.

The conventional method of heating the catalytic converter is to heat the catalyst by contact with high temperature exhaust gases from the engine. This heating, in conjunction with the exothermic nature of the oxidation reaction occurring at the catalyst, will bring the catalyst to light-off temperature. However, until the light-off temperature is reached, the exhaust gas passes through the catalyst relatively unchanged. In addition, the composition of the engine exhaust changes as the engine heats from the cold start temperature, and the catalyst is designed to work best with the composition of the exhaust stream present at the normal elevated engine operating temperature.

There have been several attempts to shorten or avoid the time between cold start and light-off of the catalytic converter. Current techniques employ one or more of the following methods: electrical heating of the exhaust gases and/or of the catalytic converter itself; thermal insulation; multi-chambered configurations of the catalytic converter; and/or placing the catalytic converter adjacent to the engine for heating. All of these methods have drawbacks and limitations.

Placing the catalytic converter almost immediately adjacent to the engine is not feasible because of the tendency to overheat the catalyst with resulting accelerated degradation of the catalyst. Thermal insulation is also not an acceptable option because of the same problems, especially during operation under maximum operating temperature ranges.

Electrical heating of catalytic converters ("EHC") has been a popular proposed method of attempting to preheat the catalyst monoliths. Limitations on the equipment and process, however, affect the utility of this method. The primary limitation on electrical preheating is the electrical energy required by the heater. The typical car battery is not a practical power source to supply the electrical power because the electrical load on the vehicle battery during the period required may exceed the rated battery output. In any event, the load placed on a typical 12 volt vehicle battery will shorten the lifetime of the battery. Also, there is a measurable delay between the time the operator of the vehicle places the ignition switch in the "on" position and the time the heater brings the catalyst to light-off temperature.

Typically, in the interval between start up and light-off, the exhaust stream is oxygen deficient. Because the catalyst requires oxygen to complete the catalytic reaction, supplemental air must be blown over the catalyst. Even when using a secondary air flow to overcome oxygen deficiency, the secondary air flow must be closely controlled to avoid an excess of oxygen, in which case the catalytic converter is less effective in reducing $NO_x$. However, it should be noted that $NO_x$ contributes a very small portion of unacceptable emissions when an engine is cold; most of the emissions that must be dealt with comprise HC, CO and the like.

An alternative to battery powered electrical heating has been to decrease the strain on the power supply by supplying the power directly from an alternator rather than directly from the vehicle battery. An alternator powered, electrically heated catalyst ("APEHC") still requires a 5 to 10% increase in battery capacity to cope with the EHC start-up scenario. Even with the APEHC system, there still is a concern with respect to battery capacity because electric heating is needed for an extended period of time, i.e., more than 25–30 seconds. In addition, the maximum alternator power output required in the APEHC system requires a complicated switching mechanism and an altered alternator speed between 2,000 and 4,500 rpm during the heating up time period, and the alternator must be oversized.

The multi-chamber configurations of catalytic converters generally conform to one or two theories. In one multi-chamber configuration, a small portion of catalyst known as a "starter catalyst" is positioned upstream from the primary catalyst. This "starter catalyst" is generally closer to the exhaust manifold. This location, in conjunction with a smaller thermal mass associated with its smaller size, causes the catalyst to heat much more quickly than a single catalyst. This configuration, however, is generally unacceptable because the starter catalyst in the exhaust stream creates a higher back pressure which reduces the overall engine efficiency and robs the engine of power output.

Another method of providing multiple chambers in the exhaust flow includes a first catalyst having low temperature characteristics used only during cold start conditions, and, after the catalyst temperature rises to a selected elevated level, the exhaust gas flow is switched to pass through the conventional catalytic converter configuration. A variation of this approach is to run all cold start emissions through a separate absorber (such as a zeolite or a molecular sieve-type substance) where unacceptable emissions are captured and later released back into the exhaust stream. This method, however, is impractical because of the complicated switching mechanism used to divert flow to the absorber, the size and space requirements of the absorber, and the impracticality of releasing the unacceptable emissions from the absorber back into the exhaust stream.

Finally, one method runs the engine excessively rich in the cold start condition and ignites the resulting super-rich mixture to directly heat the catalyst. This approach has proved wholly unreliable and has other serious drawbacks, including reduced engine and catalyst life.

To date, there has not been a catalytic converter heating system which gives almost instantaneous heating of the catalytic converter without the inherent drawbacks stated above. Thus, there remains a need for an improved catalytic converter system that reduces ineffective catalytic action immediately after cold start-up of an engine. Such a system must be simple and must not reduce the rated lifetime of the engine, the catalytic converter, or the battery components of the vehicle.

SUMMARY OF THE INVENTION

The present invention provides a catalytic converter system for the exhaust of an internal combustion engine with an exhaust line, comprising: a catalytic converter in the exhaust line; a source of hydrogen; a conduit connecting the source of hydrogen to the exhaust line upstream of the catalytic converter; a temperature sensor in the catalytic converter; and means for controlling the introduction of hydrogen from the source of hydrogen to the exhaust line, based on a temperature sensed by the temperature sensor.

Another aspect of the invention provides a catalytic converter in the exhaust line of an internal combustion engine, comprising: a canister; a plurality of catalytic monoliths within the canister; a source of hydrogen; a gap between each of the plurality of monoliths; and means for introducing hydrogen from the source of hydrogen into the canister upstream of the plurality of monoliths and into the gap between each of the plurality of monoliths. The means for introducing hydrogen may comprise a manifold within or outside the canister.

Yet another aspect of the invention provides a catalytic converter system for the exhaust of an internal combustion engine with an exhaust line, comprising: a catalytic converter in the exhaust line; a source of hydrogen; a conduit connecting the source of hydrogen to the exhaust line upstream of the catalytic converter; a source of oxygen; means for controlling the introduction of hydrogen from the source of hydrogen to the exhaust line; means for controlling the introduction of oxygen from the source of oxygen to the exhaust line, independent of the means for controlling the introduction of hydrogen; an isolation valve in the exhaust line upstream of the catalytic converter; and an isolation valve in the exhaust line downstream of the catalytic converter.

The present invention also provides a heater for the passenger compartment of a vehicle, comprising: a heat exchanger defining a first path for the flow of air to the passenger compartment and a second path, isolated from the first path, for the flow of hydrogen and oxygen gases; a catalytic converter in the second path; and means for introducing hydrogen and oxygen into the catalytic converter.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

FIG. 4 is a sectional view of a simplified representation of a catalytic converter monolith showing air and hydrogen flow in the axial direction;

FIG. 5 is a sectional view of a simplified representation of a catalytic converter monolith showing air and hydrogen flow in the radial direction;

FIG. 15 is a schematic diagram of a catalytic gas heater for a diesel engine.

FIG. 18 is a schematic diagram of a catalytic converter having isolation valves allowing hydrogen or oxygen to diffuse evenly throughout the monolith before delivery of another gas to provide a catalytic combination mixture.

FIG. 20 is a flowsheet showing the modes of operation for an ideal chemically heated catalyst (CHC, a trademark of Lynntech, Inc. of College Station, Tex.) system.

FIG. 21 is a schematic diagram of a preferred configuration of the cabin heater.

DETAILED DESCRIPTION OF A PREFERRED EMBODIMENT

The present invention provides a method and apparatus for chemically heating by feeding hydrogen to a catalyst. The invention also provides a method and apparatus for thermally conditioning a catalyst in order to enhance the conversion of unacceptable emissions emanating from an internal combustion engine into water and other acceptable emissions. In one aspect of the invention, hydrogen is supplied from an electrolyzer or other hydrogen source and injected into the monolith of a catalytic converter to more rapidly bring the catalyst to a light-off temperature.

Figure 1:
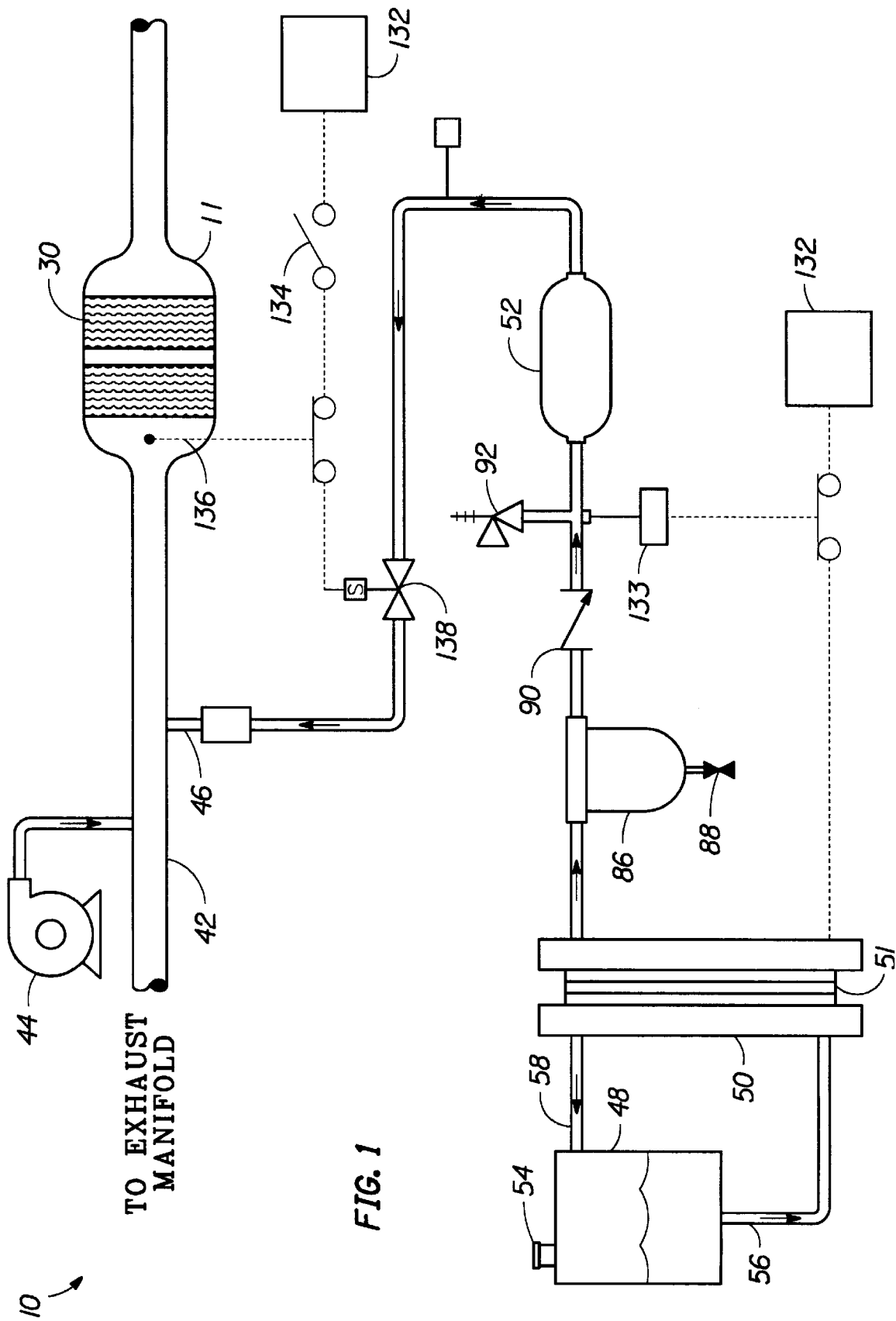
FIG. 1 is a schematic diagram of the apparatus of the present invention for heating a catalytic converter.

FIG. 1 shows a system 10 of the present invention installed on a vehicle exhaust system. The vehicle includes a catalytic converter 11 located in an exhaust line 42 from a vehicle's exhaust manifold, as shown. The exhaust line 42 is provided with air from an air pump 44 and hydrogen from a hydrogen inlet line 46. The air pump could be any suitable air source, such as a receiver, for injecting air into the exhaust line at suitable pressure and volumetric flow rate to achieve the ideal air/hydrogen ratio mixture.

The hydrogen supply system of the invention generally includes a water reservoir 48, an electrolyzer 50, and a hydrogen storage cylinder 52. As shown in FIG. 1, the electrolyzer 50 may preferably compromise a plurality of stacked identical cells 51. The reservoir 48 serves both as a water reservoir and as a separator for oxygen and water. The reservoir 48 may be a vehicle's windshield washer fluid storage container, but is preferably a dedicated separator allowing collection and storage of oxygen via port 54. Water flows by gravity drain or is pumped from the reservoir 48 to the electrolyzer 50 via a drain line 56. As the electolyzer produces hydrogen and oxygen, the oxygen and entrained water flows naturally back to the reservoir 48 via a return line 58.

Figure 2:
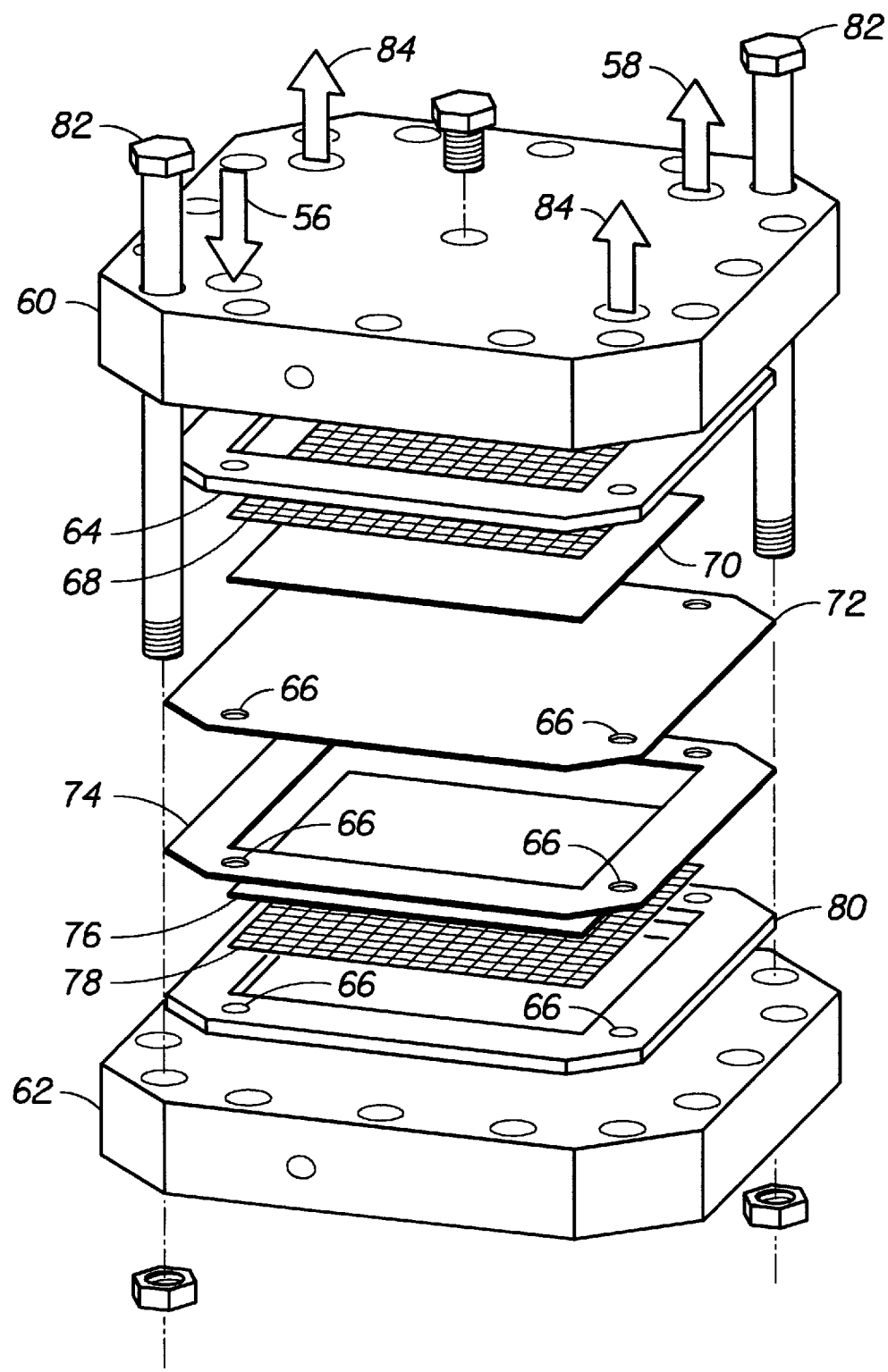
FIG. 2 is an exploded view of a preferred electrolyzer that may be employed in the present invention.

The next major component of the hydrogen source is the electrolyzer 50, shown in greater detail in FIG. 2. In the following description of the electrolyzer 50, the materials of construction referred to as "preferred" are the material actually used in a test device to prove that the invention would work for its intended purpose. In commercial production models of the present invention, where possible, less expensive materials will be used throughout, such as carbon steel for titanium where possible, and plastic such as polypropylene where heat and stress will permit the use of such material.

The electrolyzer 50 may be referred to herein as a proton exchange membrane (PEM) electrolyzer 50. The proton exchange membrane itself may prove corrosive in this environment in contact with certain substances, thus requiring the careful selection of the material of construction of the electrolyzer. For example, the PEM should only contact carbon or graphite. However, those of skill in the art will readily recognize where less exotic materials than those listed in the following discussion that are located away from the PEM material itself and the oxygen electrode catalyst can be readily employed without penalty. For example, graphite will be the material of choice in certain structural elements, and not some obvious candidates such as copper, aluminum, or iron, which can corrode thus forming ions that can poison the oxygen and/or hydrogen electrode catalysts.

Now referring to FIG. 2, the PEM electrolyzer 50 is shown as a cell stack including a pair of endplates 60 and 62. The endplates 60 and 62 are preferably titanium and measure 4.2"×4.2"×¾". Adjacent the top endplate 60 is an anodic cell frame 64. The cell frame 64 is preferably a carbon fiber-filled Teflon sheet, sold under the trademark ZYMAXX by Du Pont. The cell frame 64 retains a 1:1 molar ratio of iridium and ruthenium dioxides ($IrO_2/RuO_2$) as the anodic electrocatalyst. The cell frame 64 also includes a plurality of flow ports 66 to permit the supply of reactant (water) and/or removal of electrolysis product (oxygen gas). Below the cell frame 64 is an expanded titanium metal current collector (flow field) 68, preferably 25 Ti 40-3/32 from Exmet Corp. An anode substrate 70 is preferably a porous titanium plate measuring 2.49"×2.49"×0.05". Below the anode substrate 70 is a proton exchange membrane 72, cut from a sheet of NAFION 117 from Du Pont which serves as a solid electrolyte material and which is 175 $\mu$m thick.

FIG. 2 depicts a gasket 74, one of perhaps several installed where required. Gaskets 74 are stamped from 0.033" thick fluorosilicone sheet (VITON) and from 0.005" thick unsintered PTFE sheet. The electrolyzer 50 further includes a cathode substrate 76 like the anode substrate 70 and an expanded titanium flow field 78.

Finally, the PEM electrolyzer 50 includes a cathodic cell frame 80 formed of polychlorotrifluorethylene (PCTFE) sheet, sold under the trademark KEL-F by Afton Plastics. The cathodic cell frame 80 retains a fuel cell gas diffusion electrode containing high surface area colloidal platinum, supported on platinum black, having platinum loading of 4.0 $mg/cm^2$ as the cathodic electrocatalyst layer.

As shown in FIG. 2, the various components of the PEM electrolyzer are stacked together and retained with a plurality of tie rods 82, preferably 16 such tie rods. Stainless steel tubing, such as SS316, are then screwed into four threaded ports on one of the titanium endplates. The ports are the water inlet port 56, the oxygen outlet port 58, and a pair of hydrogen outlet ports 84. To minimize electrical contact resistance, the titanium endplates 60 and 62 and the expanded titanium metal current collectors 68 and 78 may be electroplated with a thin film of gold or other noble metals, such as platinum.

The cathode and the anode of the electrolyzer are of special construction. The cathodic electrode structure for hydrogen evolution is fashioned from a commercially available fuel cell gas diffusion layer on a carbon cloth backing, which acts as a support for the active hydrophilic electrocatalyst layer. This active layer contains high surface area colloidal platinum (100 $m^2/g$), supported on carbon black (60 wt % Pt on C), yielding a platinum loading of 4.0 $mg/cm^2$. The cathodic electrode structure, having an area of 40 $cm^2$, was hot-pressed onto one side of a segment of precleaned NAFION 117 PEM material. Hot-pressing was carried out between the plates of a hot-press elevated to 200° C. for 60 seconds, and using a force of 15,000 pounds.

For the anodic electrocatalyst layer, a 1:1 molar ratio of iridium and ruthenium chlorides are dissolved in ca. 8 ml of concentrated HCl and heated to almost dryness. The resulting chlorides are then dissolved in isopropanol to make an ink-line coating. A porous titanium plate, 0.05" in diameter from Astro Met of Cincinnati, Ohio, is etched in 12% $HBF_4$ for 60 seconds and rinsed with isopropanol. This substrate is then coated with the ink-like mixture and the solvent evaporated under low heat of about 90° C. This coating and drying procedure is repeated seven times, then the electrode is heated in a furnace at 400° C. for 10 minutes in ambient air. The coating, drying, and furnace treatment is repeated twice more, but with a final baking time of two hours instead of 10 minutes.

Figure 3:
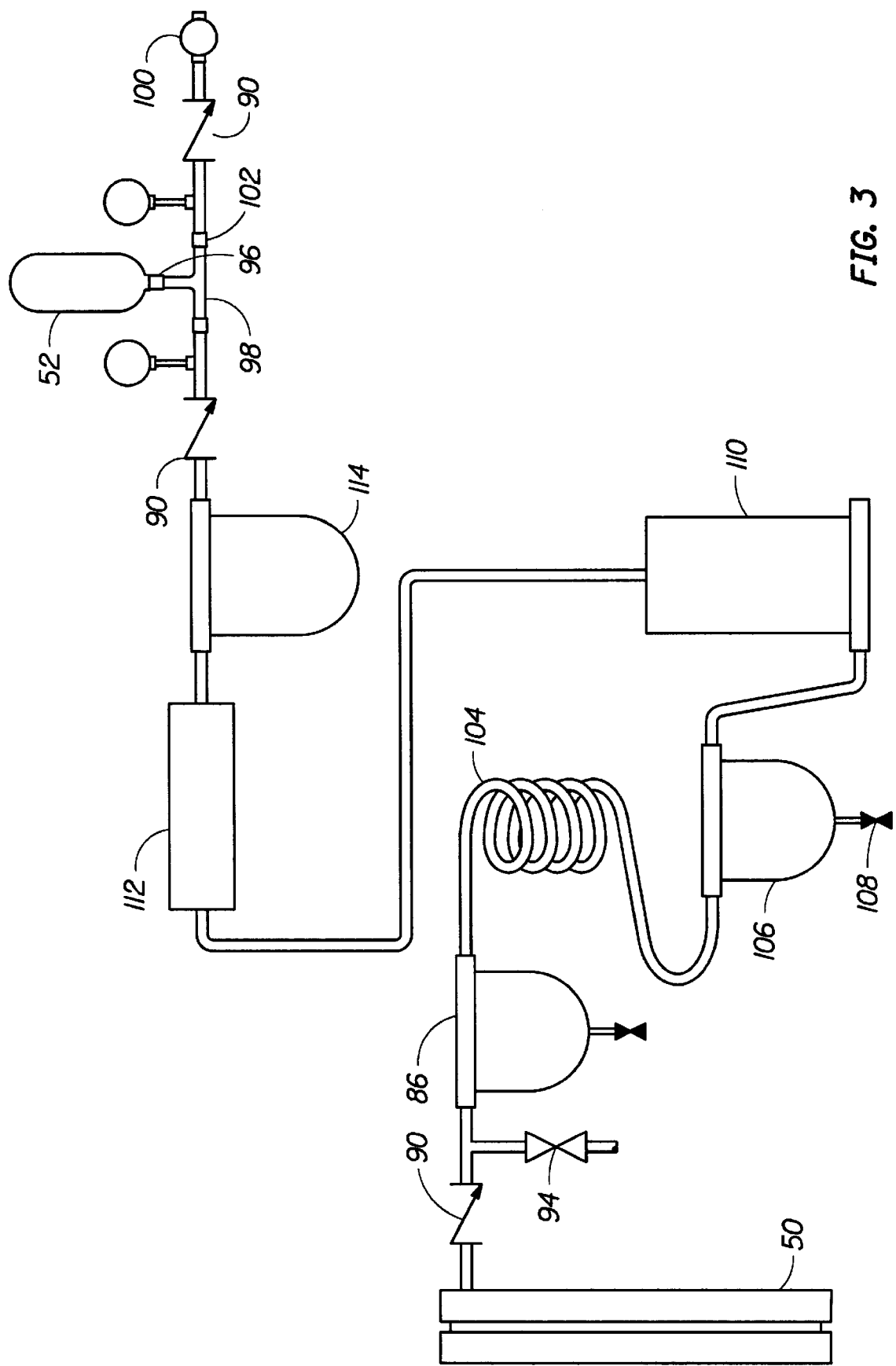
FIG. 3 is a schematic of a hydrogen capturing and handling detail of the system of the present invention.
Figure 6A:
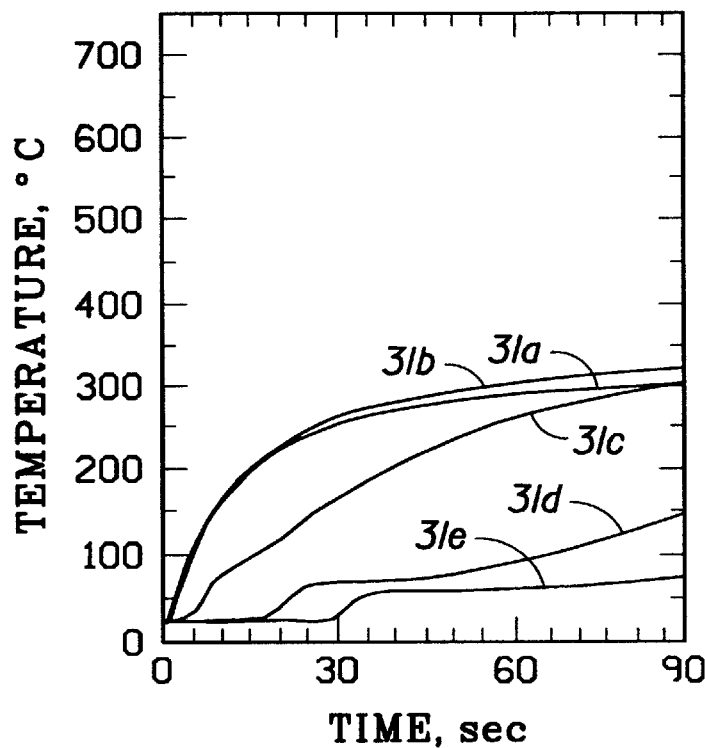
FIG. 6 is a graph of the catalyst temperature measured at axial positions within the monolith as indicated in FIG. 5.
Figure 6B:
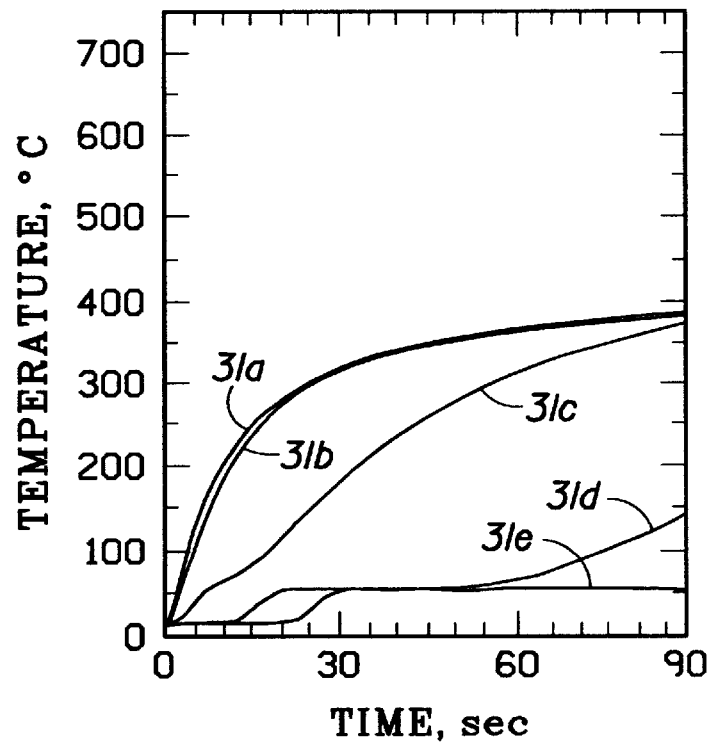
Figure 6C:
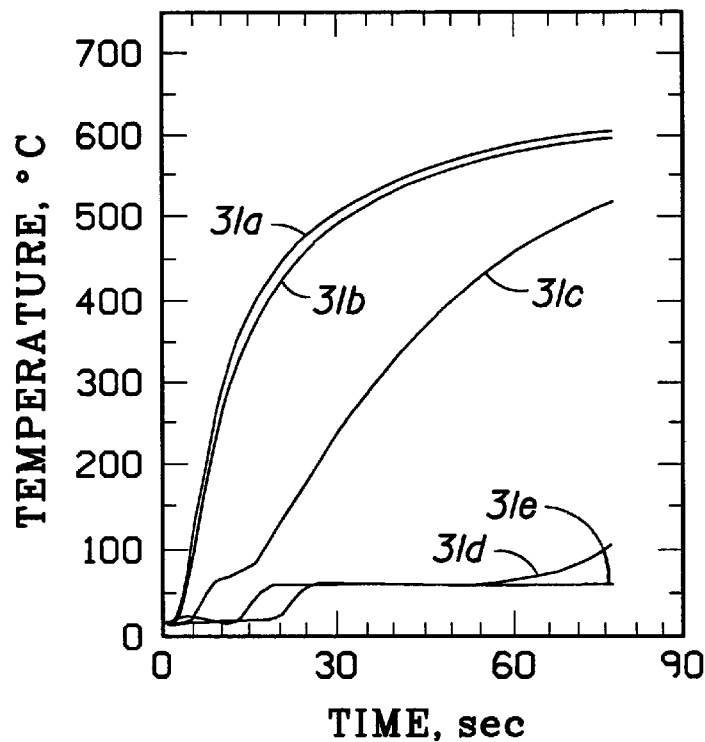
Figure 6D:
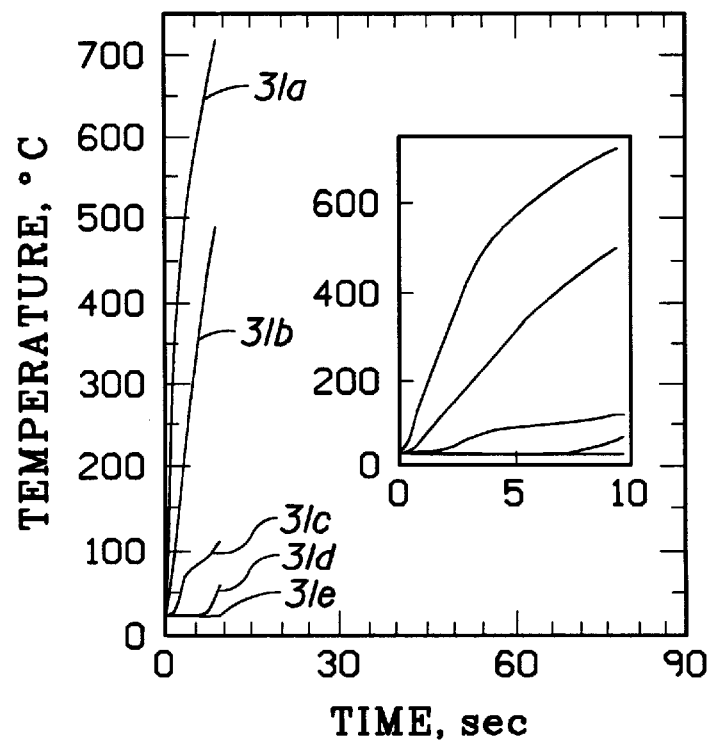
Figure 7A:
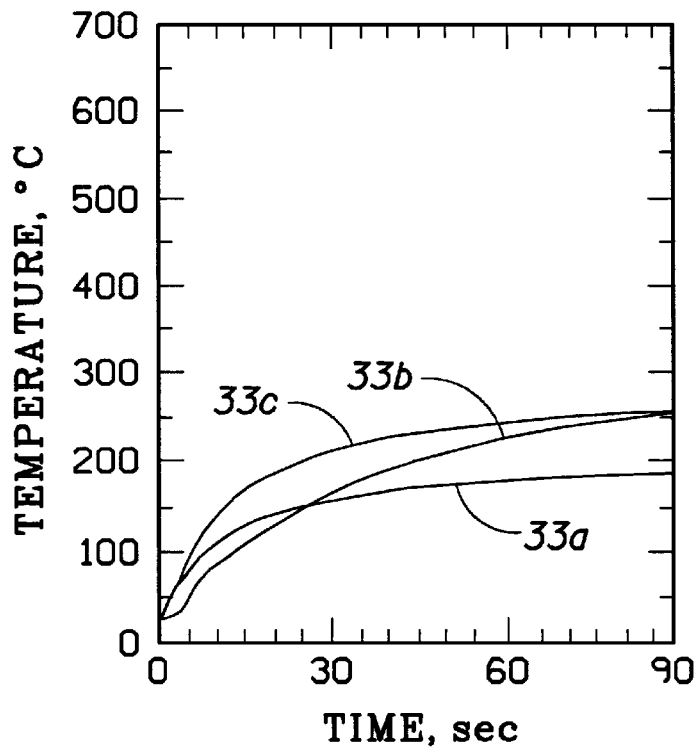
FIG. 7 is a graph of the catalyst temperature measured at radial positions within the monolith as indicated in FIG. 4.
Figure 7B:
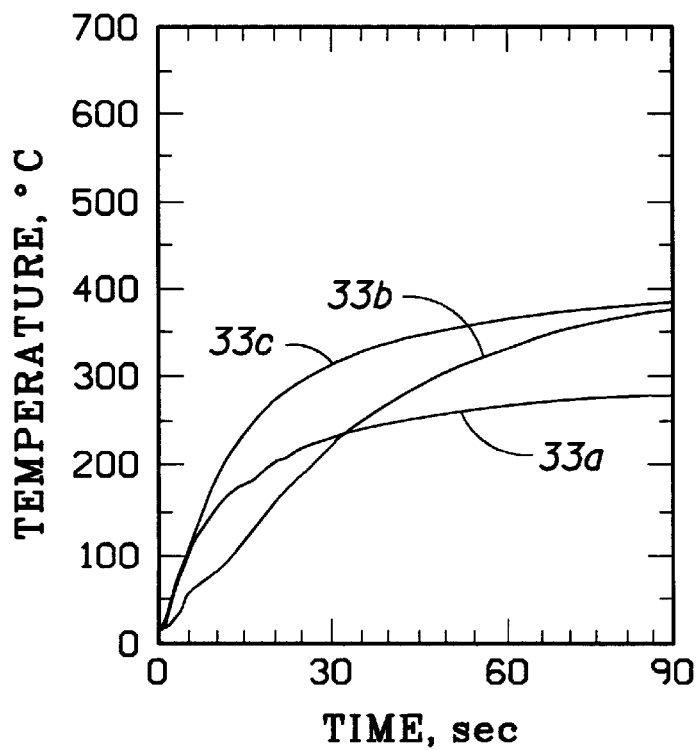
Figure 7C:
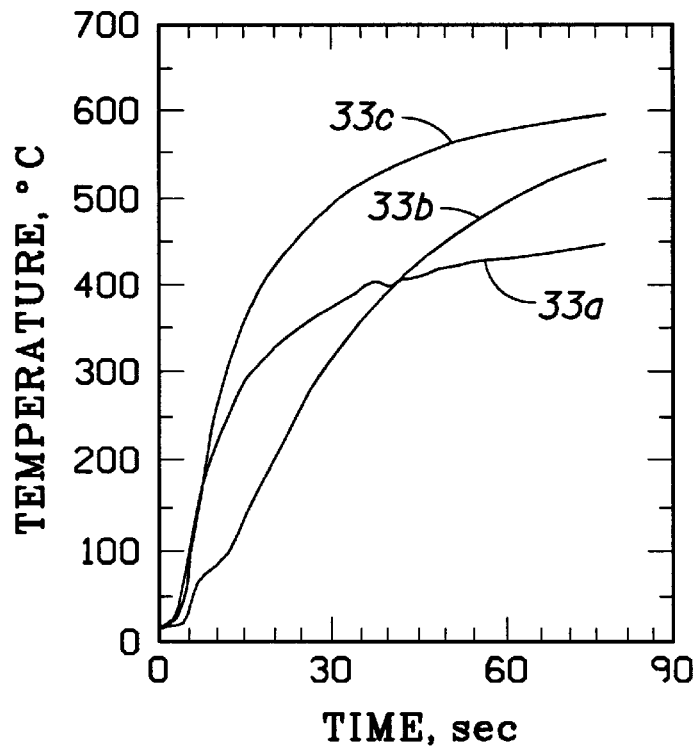
Figure 7D:
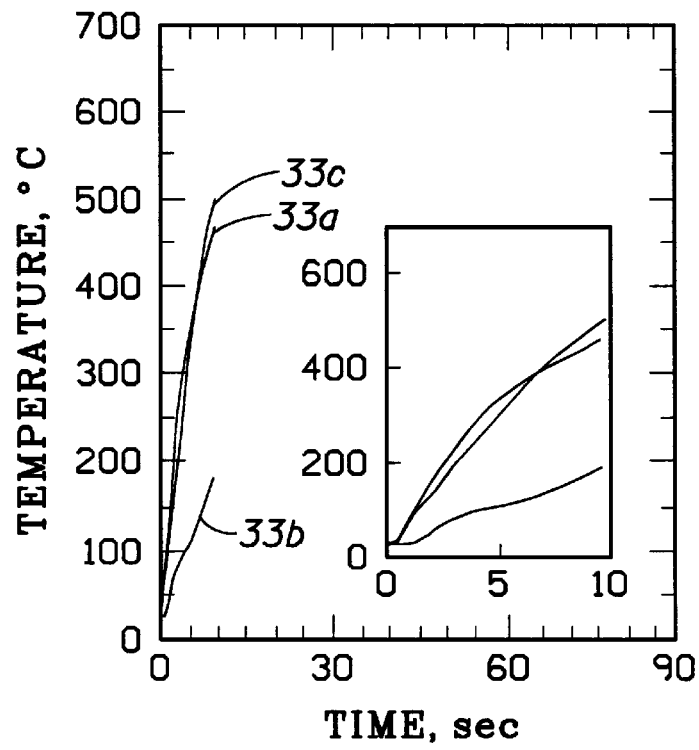

Referring back to FIG. 1, the system further includes a hydrogen storage cylinder and various supporting components in addition to the reservoir 48 and the electrolyzer 50, described above. The components include a liquid water trap 86 to eliminate most of the entrained water from the hydrogen exiting the electrolyzer, a solenoid valve 88 to blow out the trap, a check valve 90, and a pressure relief valve 92 to protect the system against over pressurization. FIG. 3 depicts additional details and a preferred arrangement of the hydrogen gas handling and capture system.

As previously described, the electrolyzer 50 includes a proton exchange membrane in its construction so that generated oxygen is vented to the water source reservoir and the hydrogen generated can be accumulated at pressure. Prior to operation, the system of FIG. 3 permits purging with an inert gas, such as nitrogen. For safety reasons, all air is first removed from the system by attaching a nitrogen gas feedline at a purge gas inlet 94 downstream of a check valve 90. During the purging operation, the hydrogen storage cylinder or vessel 52, such as a metal hydride vessel, is detached at a quick disconnect 96. This operation effectively seals both the vessel 52 and a gas line 98, to keep the purge gas out of the vessel 52. The remainder of the system is then purged from the purge gas inlet 94 through a back pressure regulator 100.

To charge the system with hydrogen, the needle valve 102 between the storage vessel 52 and the back pressure regulator 100 is shut. Hydrogen gas generated by the electrolyzer is processed through a four-stage process to remove entrained water (liquid or vapor) and any oxygen contaminant from the hydrogen stream before storage. The first step involves removal of a small amount of entrained liquid water coming from the electrolyzer in the hydrogen gas. This entrained liquid water is removed without a pressure loss by means of the entrained liquid water trap 86. The second step involves cooling the hydrogen gas stream from the electrolyzer temperature to ambient in a condensing coil 104. The electrolyzer typically operates at about 20° C. above ambient, with the exact temperature depending on specific electrolyzer operating conditions. This second step condenses a substantial portion of the water vapor in the hydrogen gas stream. This condensed water could absorb a significant amount of alcohol, which may be present during operation using windshield washer fluid as the electrolyzer reactant feed. The condensate is collected in a condensate collector 106 and removed through a drain valve 108.

At this point, the hydrogen gas stream is still saturated with water vapor, but now at a lower temperature. This saturated gas stream is next passed into a zeolite-filled gas drier 110. This drier absorbs water vapor and any alcohol vapor present when using a windshield washer fluid feed. Any oxygen contaminant present in the hydrogen gas stream is then eliminated in a catalytic recombiner or oxygen eliminator 112 to reduce it to water. Final clean-up of the hydrogen gas stream is accomplished in a second zeolite absorber bed in a polishing drier 114. The polishing drier removes traces of water produced by the catalytic recombiner 112.

The hydrogen gas handling system of FIG. 3 is designed for relatively short term operation; longer term operations, for example 100,000 miles, would utilize other methods of water removal known in the art. A satisfactory metal hydride hydrogen storage unit is available from Hydrogen Consultants of Littleton, Colo. Such an available unit can store 30 liters of hydrogen which can be delivered at 30–45 psig, with recharging using hydrogen gas at 100–200 psig. More preferably, the hydrogen storage vessel is a pressure vessel made of a composite structure, aluminum or ferrous-based alloys. A suitable hydrogen storage vessel of this type is available from Harless Specialties.

Now referring to FIG. 4, a simplified cross-sectional view of a catalytic converter monolith shows air and hydrogen flow in the axial direction through the monolith 30. The temperature of the monolith is measured with a thermocouple at points 31 (a)–(e) along the central axis, with point 31 (a) being on the front face where the gases first contact the catalyst and the other points 31 (b)–(e) located at positions successively further into the monolith. The results of these temperature measurements at 40 liters per minute (LPM) total gas flow rate containing 3%, 5%, 8.5% and 17% hydrogen is shown in FIGS. 6(a)–(d). FIGS. 6(a)–(d) are graphs of the catalyst temperature measured at axial positions within the monolith as indicated in FIG. 4.

Now referring to FIG. 5, a simplified cross-sectional view of a catalytic converter monolith shows air and hydrogen flow in the radial direction through the monolith 30. The temperature of the monolith is measured with a thermocouple at points 33(a)–(c) along the monolith radius, with point 33(c) being in the center of the monolith and the other points 31(b) and (a) located at greater distances from the center. The results of these temperature measurements at 40 liters per minute (LPM) total gas flow rate containing 3%, 5%, 8.5% and 17% hydrogen is shown in FIGS. 7(a)–(d). FIGS. 7(a)–(d) are graphs of the catalyst temperature measured at radial positions within the monolith as indicated in FIG. 5.

It has been found that the introduction of a relatively small percentage of hydrogen in the air stream of a typical automobile gas exhaust provides nearly spontaneous heating of a major portion of a face 32 (see FIG. 4) of the catalyst material almost immediately following ignition in the internal combustion engine providing the exhaust gas. This heating along the face 32 of the converter is fortuitous because it has been found that the most effective site for providing local heating is along and near the upstream face 32 of the catalyst monolith 30. In fact, where the monolith 30 is made of a material that heats slowly when used in association with the present invention, the face 32 may comprise a more reactive catalytic material to bring the entire catalytic converter to light-off more quickly. In addition, the heat supplied by the spontaneous catalytic combustion of the hydrogen in the presence of the catalytic converter 30 produces only a small quantity of water as a product of the reaction, which does not degrade the performance of the catalytic converter.

The air flow rate, depending on engine size and tuning parameters, typically falls in the range of 40 to 250 liters per minute (LPM). The ideal range is between 80 and 200 Imp, depending on engine size. Effective concentrations of hydrogen for these flow rates are one to twenty-eight volume percent, with a preferred range of five to eighteen percent. The ideal range of hydrogen concentration, again depending on engine size, has been found to be eight to fifteen percent. For example, at 150 LPM flow rate across the catalytic converter, the ideal range of hydrogen concentration in that flow is 12 to 13 volume percent. Under those conditions, light-off temperature at the face 32 is reached in about one second. At 90 LPM and at 8.5 to 11 volume percent hydrogen, light-off is achieved in about two seconds.

The power consumption of the catalyst varies depending on the flow rate and the concentration of hydrogen. For example, at a flow rate of 30 to 50 LPM and a concentration of 10–11 ½ volume percent hydrogen, the power required to heat the monolith to light-off is approximately 1.5 Watt hours. Similar results in the electrically heated catalyst (EHC) unit require approximately 10 to 15 Watt hours.

The present invention is also suitable for use in low ambient temperature conditions, as low as −7° C. or lower. Depending on the active catalyst compositions used, the amount of time required to achieve light-off may double. In those conditions, it may be desirable to add a small electrical heater, which would be much smaller than an EHC heater and require only about 200 Watts of power, in order to achieve the results at normal ambient temperatures.

Figure 8:
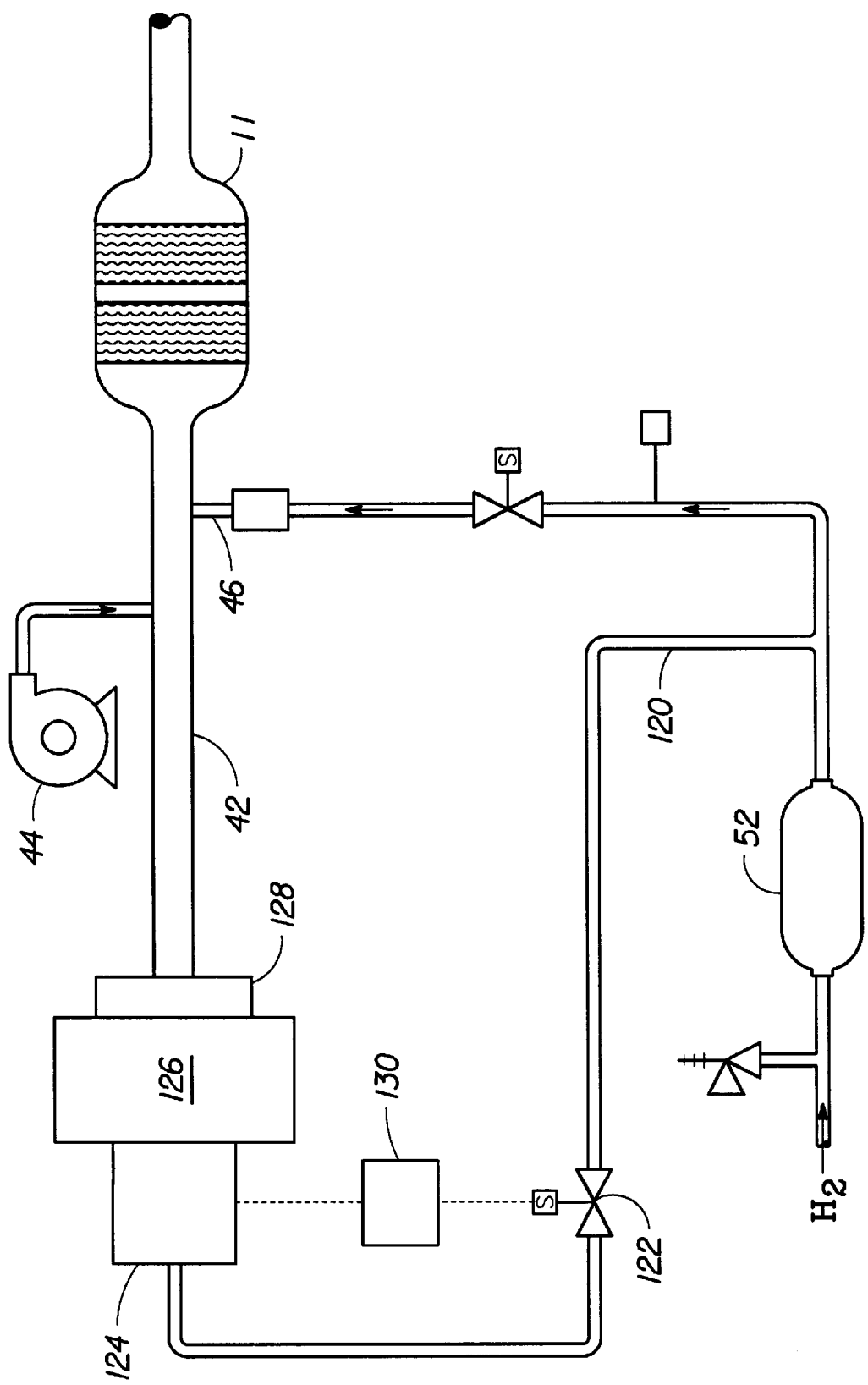
FIG. 8 is a schematic diagram of the apparatus of the present invention depicting a system for the combustion of hydrogen for cold start-up assist for an internal combustion engine.

Now referring to FIG. 8, one aspect of the invention provides an on-board hydrogen ignition assist system. A source of hydrogen, such as the electrolyzer described above or any suitable means, fills the hydrogen storage cylinder 52. An ignition supply line to a control valve 122 controls the supply of hydrogen into an engine ignition 124. The engine ignition 124 includes the fuel, air, and electrical components for an internal combustion engine 126. Thus, the hydrogen can be supplied at any convenient location so that it is injected into the cylinders of the engine 126. For example, hydrogen under pressure can be supplied to the intake manifold where there is already a fuel/air mixture (during the inlet cycle), or the hydrogen can be mixed with air before it goes to the engines fuel injection system, or other means.

The system of FIG. 8 turns the internal combustion engine 126 into a hydrogen fuel injected engine for the first few seconds of start-up, before any gasoline is introduced into the engine. This way, the catalytic converter can be brought to light-off temperature before the engine begins producing undesirable emissions. Then, when gasoline is finally injected into the system, the catalytic converter is heated to an efficient operating temperature.

Expended fuel gases are collected in an output manifold 128 and flow into the exhaust line 42. An ignition control 130 provides control signals to the control valve 122 for the introduction of hydrogen to the engine ignition 124 and to coordinate hydrogen introduction during cold start operations. The on-board hydrogen ignition assist system functions with or without the catalyst conditioning system but preferably included with such a system since they may both use the hydrogen generation and on-board storage.

Figure 9:
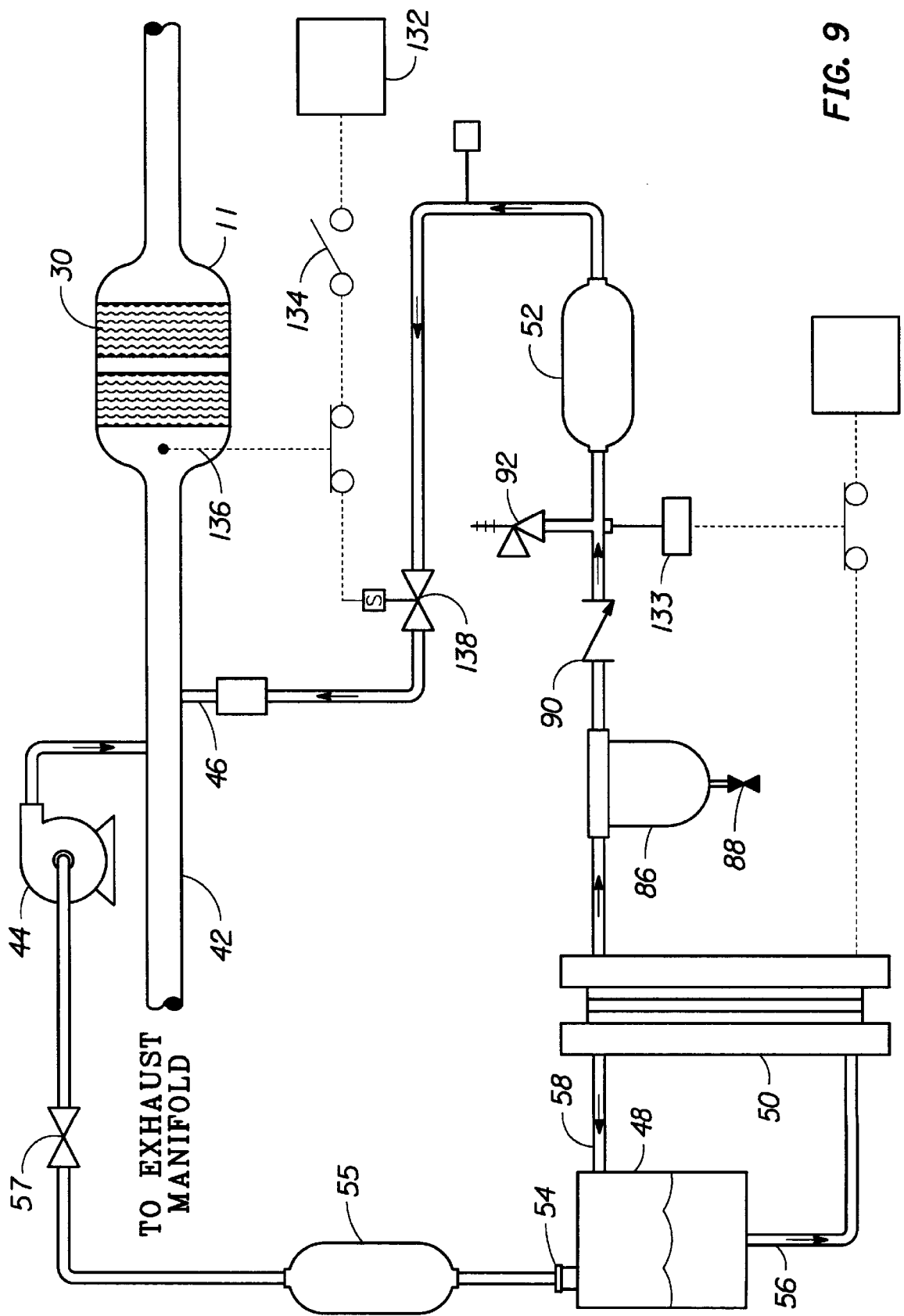
FIG. 9 is a schematic diagram of a system having oxygen recovery and storage equipment providing for injection of oxygen into the catalytic converter.

Another aspect of the invention provides oxygen recovery from the electrolyzer. Now referring to FIG. 9, a schematic diagram of a system having oxygen recovery and storage equipment is shown providing for injection of oxygen into the catalytic converter. The oxygen separated from water in the water reservoir 48, passes through the port 54 and is collected in a storage vessel or cylinder 55. During ignition, and perhaps during all operation of the vehicle, the oxygen may be released from the vessel 55 by opening a valve 57 and input into the air pump 44. In this manner, the oxygen enriches the air and provides more efficient catalytic combustion of the hydrogen or exhaust gases within the catalytic converter 11.

Figure 10:
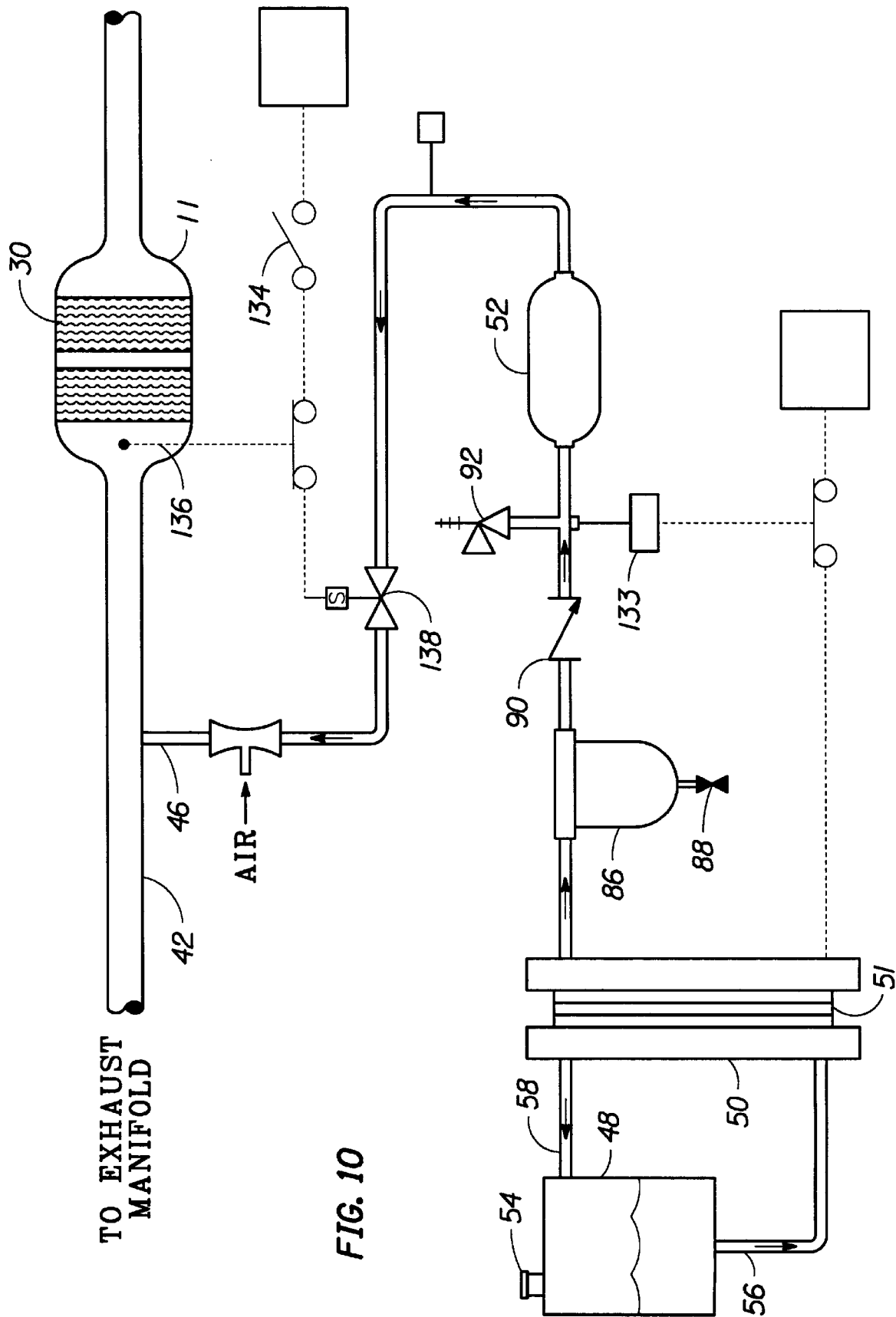
FIG. 10 is a schematic diagram of a system having the air pump replaced with a venturi for drawing air into the catalytic converter.

Now referring to FIG. 10, a schematic diagram of a system is shown having the air pump replaced with a venturi for drawing air into the catalytic converter. This aspect or embodiment of the invention, eliminates the need for an air pump by drawing air into the hydrogen delivery line 46.

Referring back to FIG. 1, a power source 132 is coupled to the hydrogen solenoid valve 138 upon engaging the ignition switch 134. In one preferred method of operation, the solenoid valve 138 may remain open or be pulsed until the thermocouple 136 reads a temperature equal to or greater than the light-off temperature.

Also in FIG. 1, the electrolyzer 50 receives power from the source 132 when the hydrogen pressure in or near the hydrogen storage vessel 52, as indicated by pressure sensor 133, falls below a setpoint pressure between about 100 psig and about 400 psig. It should be recognized that the power to the electrolyzer 50 is turned off when the pressure exceeds a high pressure setpoint, such as 400 psig. It should also be recognized that many other conditions may be considered in controlling the electrolyzer.

Figure 11:
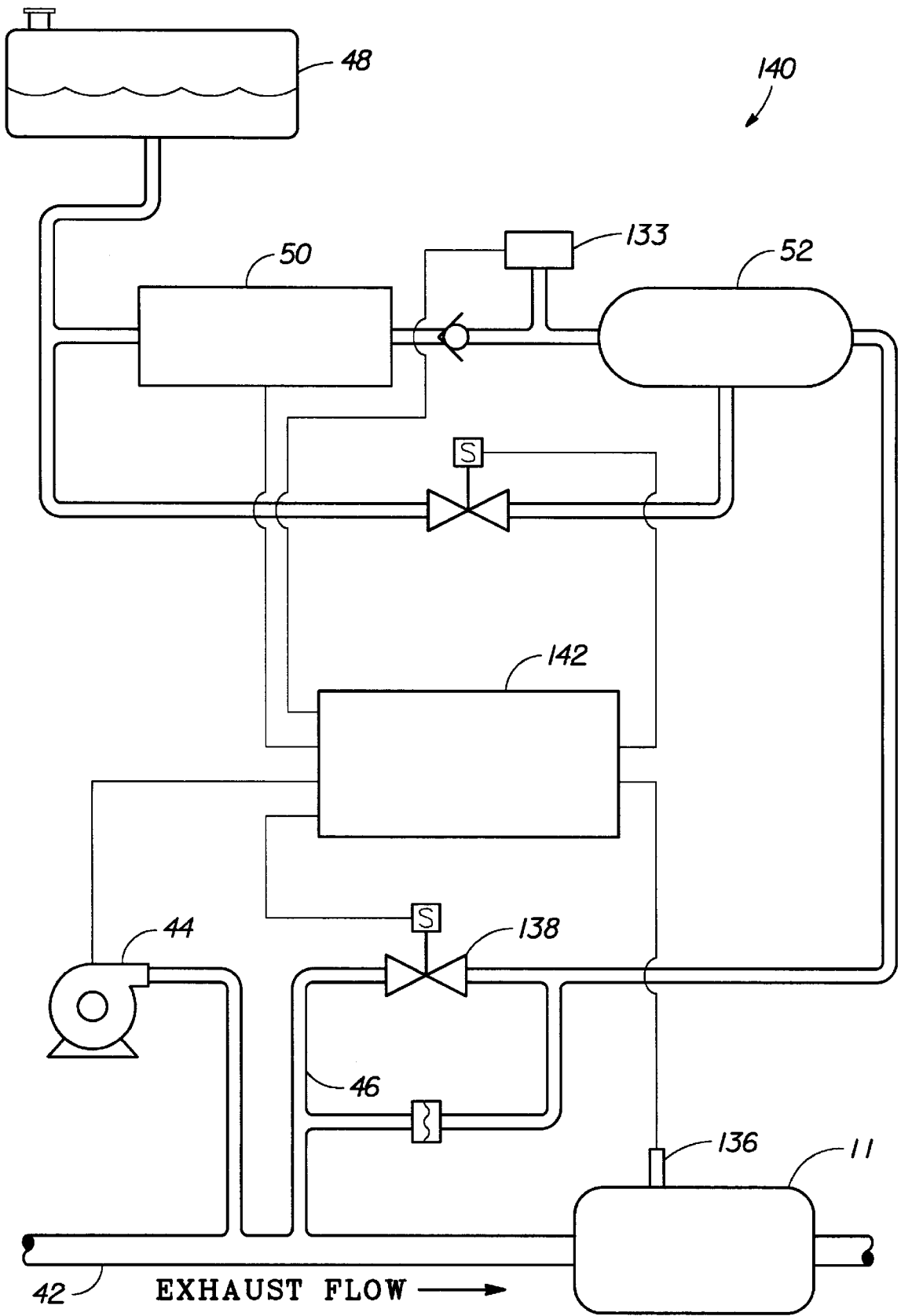
FIG. 11 is a control diagram of a prototype system using a microprocessor controller to monitor and control various functions of the system.

Now referring to FIG. 11, a control diagram illustrates a catalytic converter system 140, similar to that of FIG. 1, using a microprocessor controller 142 to monitor and control various functions of the system. For example, the temperature of the catalytic converter 11 as measured by the thermocouple 136 is communicated to the microprocessor controller 142. The controller 142 may then send a signal to the hydrogen release valve 138 to close when the temperature exceeds a light-off temperature. Furthermore, power to the electrolyzer 50 may be supplied under various conditions such as when the pressure sensor 133 indicates a low pressure in the storage tank 52. Other various control schemes and considerations may be employed as will be readily recognized by those with skill in the art which are within the scope of the present invention. For example, the microprocessor may also be programmed to carry out timed control functions apart from responding to sensory inputs, and may also serve various safety functions.

Figure 12A:
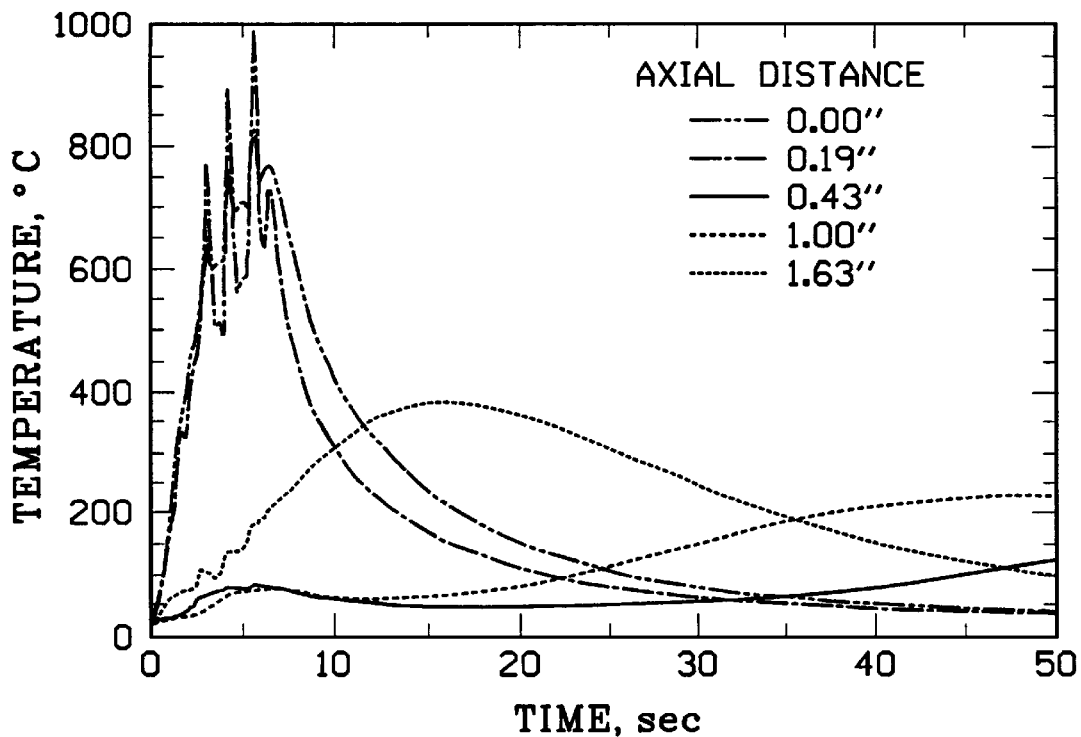
FIGS. 12(a) and (b) are graphs of the catalyst temperature at various axial and radial distances in the catalyst monolith over a period of 50 seconds using a pulsed release of hydrogen into an air stream.

Now referring to FIGS. 12(a) and (b), graphs are provided showing the catalyst temperature at various axial distances and radial distances in the catalyst monolith over a period of 50 seconds using a pulsed release of hydrogen into an air stream. The graphs show the temperature rise in the catalytic converter monolith at an air flow rate of 90 LPM and pulsed hydrogen flow controlled by a microprocessor. The pulsed hydrogen flow was provided by opening the hydrogen release valve 138 (see FIG. 1) for 0.01 seconds and closing the valve for 0.66 seconds, successively 10 times.

Figure 12B:
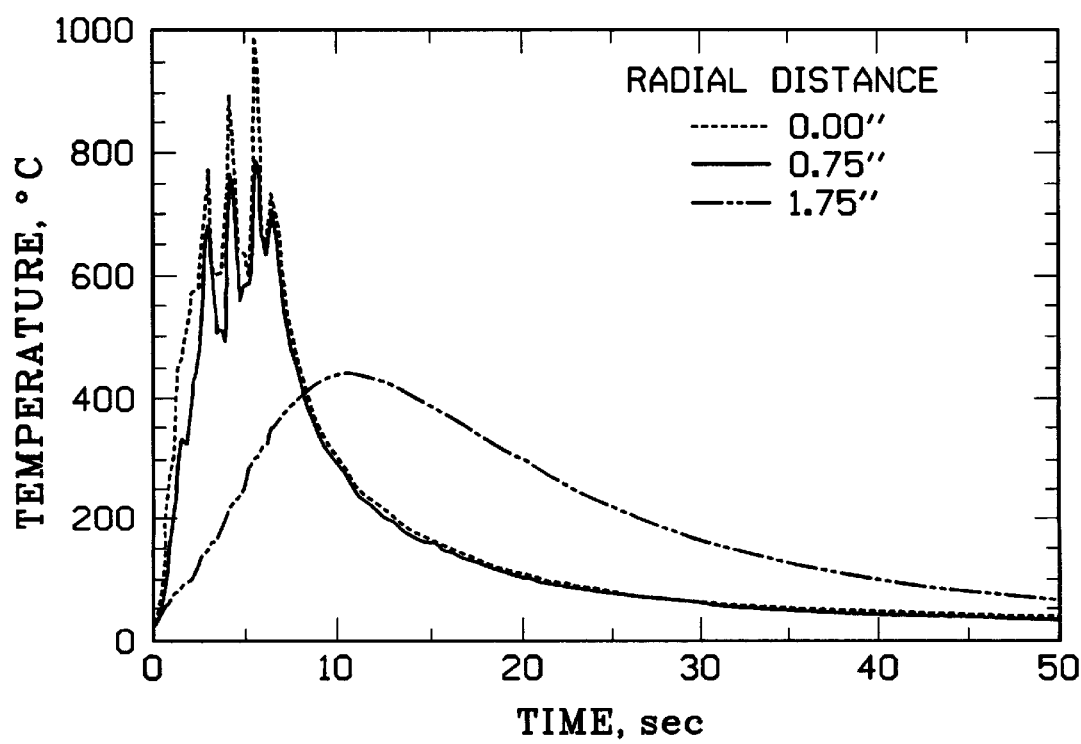

Comparing the temperature profiles of FIG. 12(a) with those of FIGS. 6(a)–(d) and the temperature profile of FIG. 12(b) with those of FIGS. 7(a)–(d) it is shown that light-off temperatures of between about 400° C. and about 600° C. can be readily attained even with pulsed hydrogen flow. One advantage of pulsed flow is the conservation of the hydrogen supply.

Figure 13:
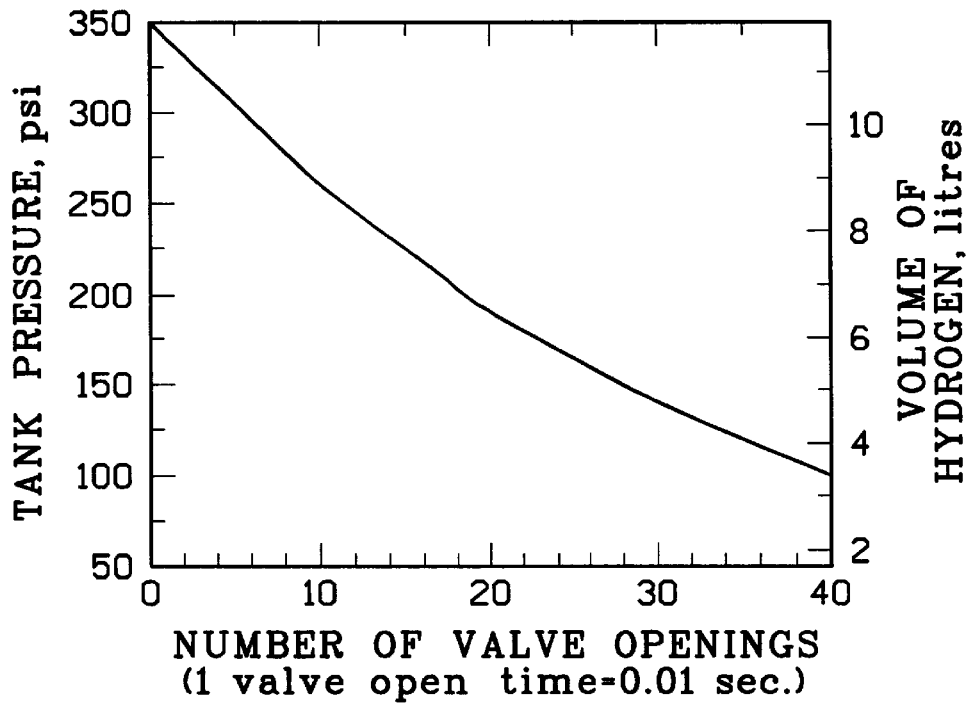
FIG. 13 is a graph of the hydrogen storage tank pressure after a series of pulsed releases in accordance with FIG. 12.

Now referring to FIG. 13, a graph of the pressure in the hydrogen storage tank after successive pulsed hydrogen releases with valve open times of 0.01 seconds and valve closed time of 0.66 seconds. Over a period of 40 pulses, the 12 liter hydrogen storage vessel is depleted to about 3 liters with a decrease in pressure from about 350 psig to about 100 psig.

Figure 14:
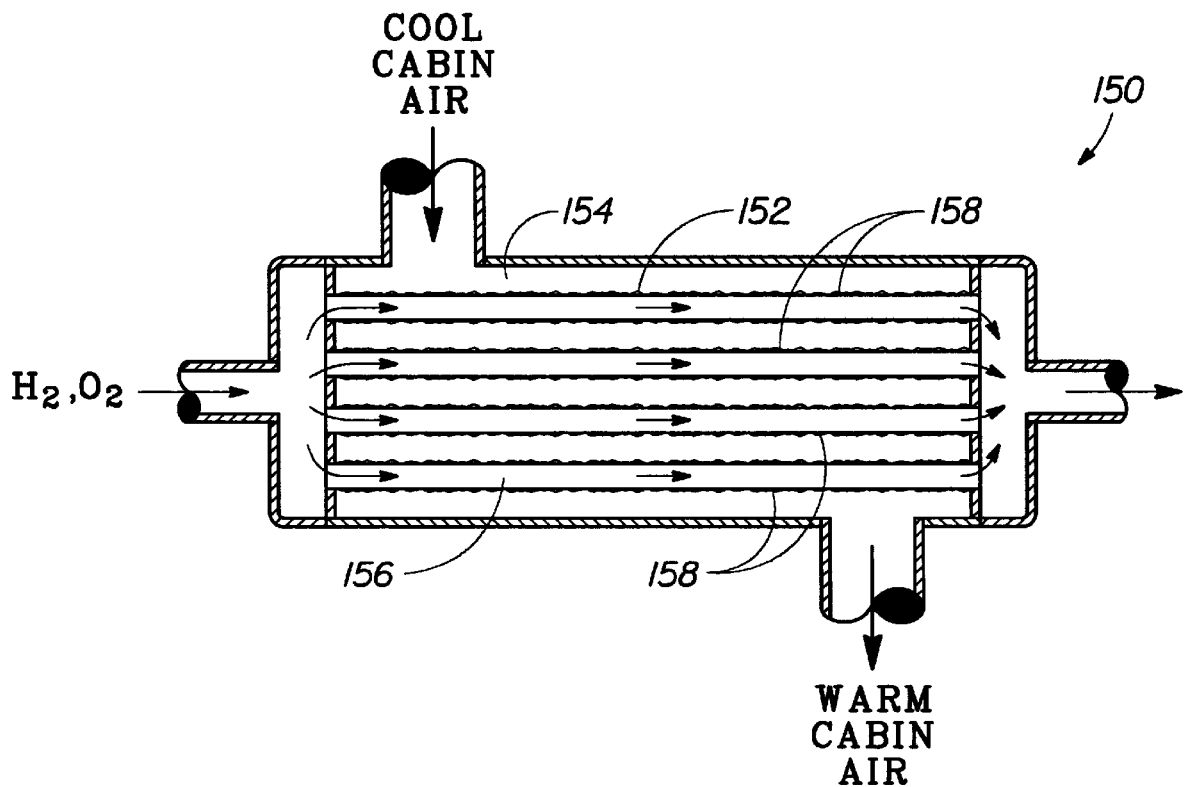
FIG. 14 is a schematic diagram of a heat exchanger having a catalyst formed on one member receiving hydrogen and oxygen and another member being suitable for the passage of air for cabin circulation.

In cold weather, a passenger cabin often takes an uncomfortably long time to heat up from the vehicle's heating system. FIG. 14 is a schematic diagram of a heat exchanger 150 having a catalyst 152 formed on one surface receiving hydrogen and oxygen and another surface suitable for the passage of air for cabin circulation. The heat exchanger may be of any type or style, such as a shell and tube heat exchanger having cabin air flow on the shell side 154 and the hydrogen/oxygen mixture on the tube side 156. The catalyst 152 is preferably formed on the internal surface of the tubes 158. It is also preferred that the heat exchanger be incorporated into or compatible with existing air circulation systems in a vehicle. A preferred configuration of the cabin heater is shown in FIG. 20 wherein the cabin air flow 154 passes through a freon loop 153, a radiator hot water loop 155, and the external surface of a heat exchanger 150 having an internal surface coated with a noble metal catalyst.

Now referring to FIG. 15, a schematic diagram of a catalytic combination gas heater 160 for a diesel engine 162 is shown. The catalytic combination gas heater 160 is filled or lined with a suitable catalyst for combination of hydrogen and oxygen to heat ambient air entering from the intake 164. Hydrogen from supply line 166, and preferably oxygen from supply line 168, are delivered to the catalytic heater 160 before entering the combustion chamber 170 of the diesel engine 162. In operation, the diesel injector 172 provides atomized diesel fuel to the chamber 170. Without the catalytic heater 160, the ambient temperature of the air passing into the chamber 170 through the air intake valve 174 may not be sufficiently warm to prevent condensation of the fuel on the chamber walls. However, the catalytic heater 160 is capable of heating the air sufficiently so that the fuel does not condense and the engine may be more readily started.

Figure 16:
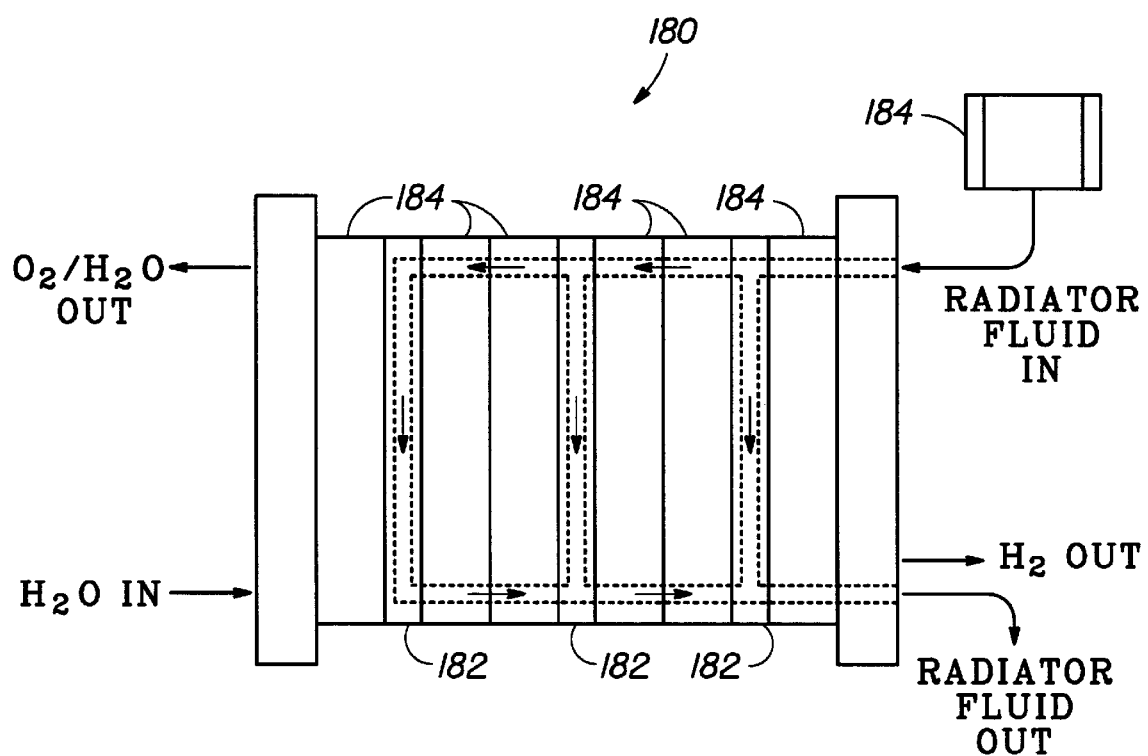
FIG. 16 is a schematic diagram of an electrolyzer having a thermal management cell for heating or cooling the electrolyzer using liquid from a vehicle radiator.

Now referring to FIG. 16, a schematic diagram of an electrolyzer 180 is shown having dummy cells 182 for heating or cooling the electrolyzer using liquid from a vehicle radiator 184. The dummy cells 182 may be comprised of plates providing a passage for the radiator fluid between electrolytic cells 184 in order to absorb or deliver heat to the electrolyzer. Because electrolyzers operate most efficiently at elevated temperatures, the radiator may be used to warm the electrolyzer in cold weather conditions. Alternately, the radiator fluid may be used to cool the electrolyzer after an extended period of use.

Figure 17A:
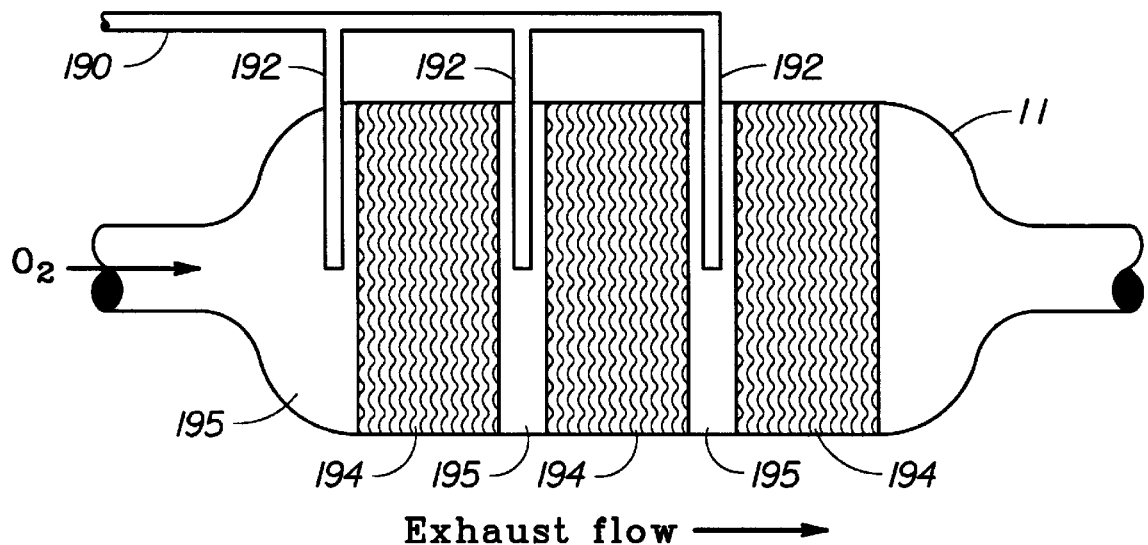
FIGS. 17(a) and (b) are catalyst monoliths having a hydrogen distributor.
Figure 17B:
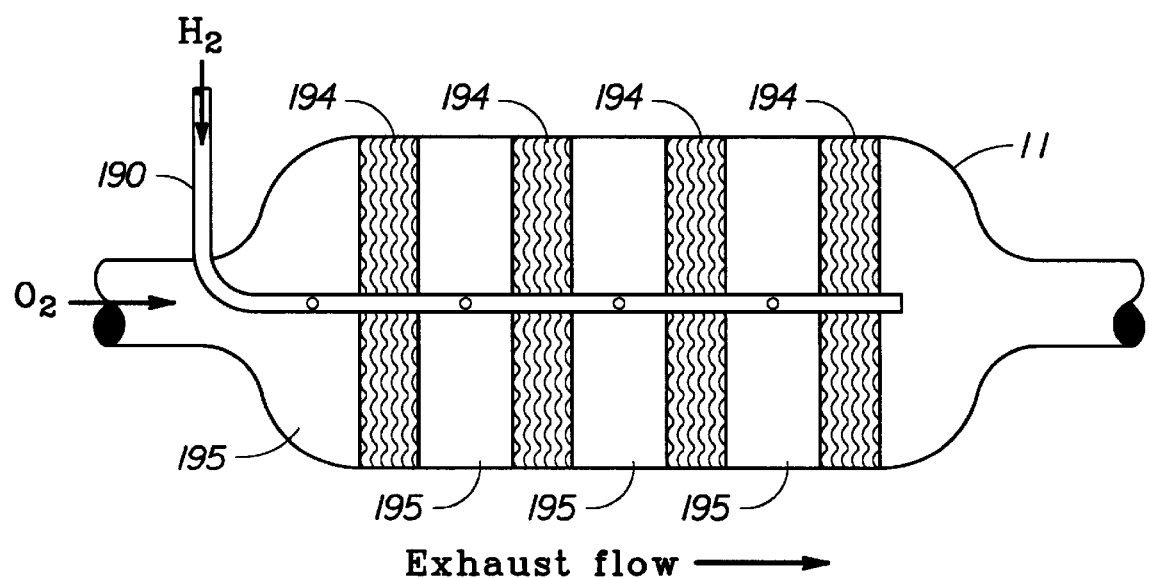

Now referring to FIGS. 17(a) and (b), two catalytic converters 11 are shown having hydrogen injection manifolds 190. In each of the figures, the converters 11 have multiple monoliths 194 separated by a short distance for hydrogen introduction and diffusion. In FIG. 17(a), the manifold is external to the converter 11 with a plurality of injection tubes 192 delivering hydrogen into the gaps 195. Conversely, in FIG. 17(b) the manifold is in the center of the monoliths 194 with a plurality of holes for hydrogen delivery into the gaps 195.

Now referring to FIG. 18, a schematic diagram of a catalytic converter 11 is shown having an upstream isolation valve 212 and a downstream isolation valve 202. When the valves 212, 202 are closed, hydrogen can be injected into the monolith 30 and allowed to diffuse evenly throughout the monolith. After only a fraction of second for diffusion, the valve 202 is opened and oxygen is delivered to provide a combination mixture. Alternately, because oxygen is a larger molecule and diffuses more slowly, it may also be advantageous to diffuse oxygen into the isolated monolith, then introduce hydrogen while opening valve 202.

Figure 19A:
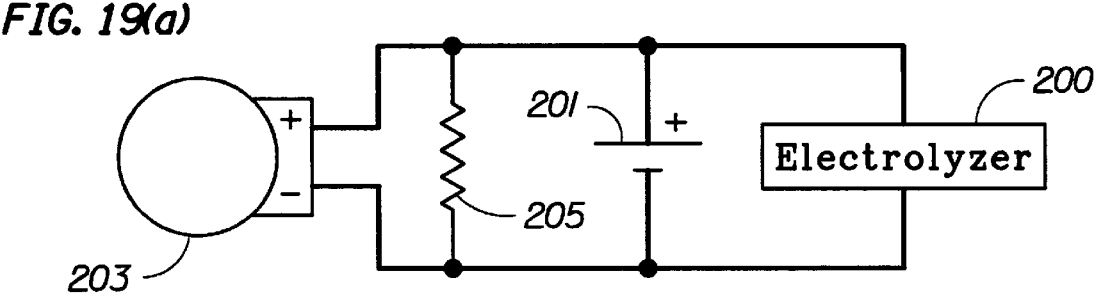
FIGS. 19(a), (b) and (c) are schematic diagrams of three electrical systems for providing electrical power to the electrolyzer.
Figure 19B:
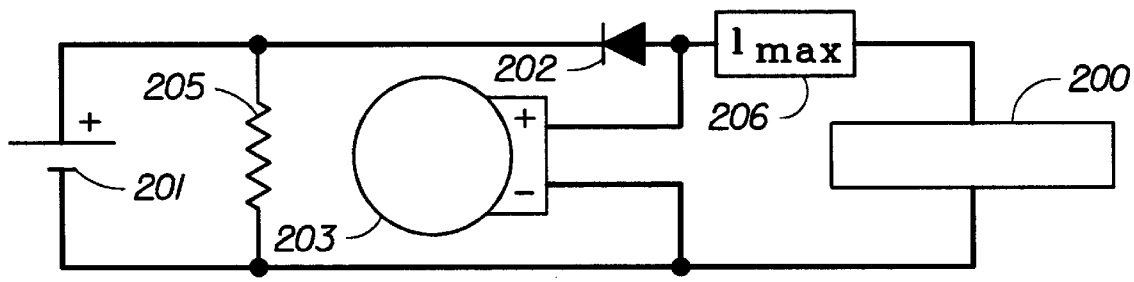
Figure 19C:
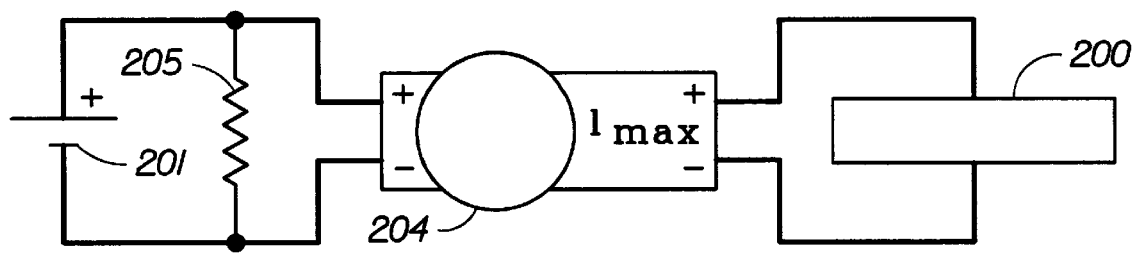
Figure 19D:
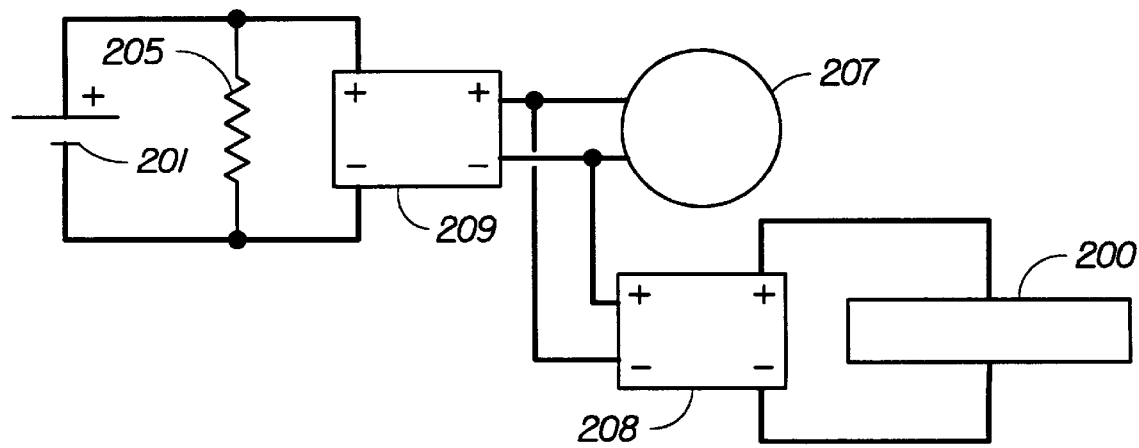

Now referring to FIG. 19(a)–(d) which are schematic diagrams outlining four possible topologies for the powering of the electrolyzer system 200. In FIG. 19(a) the primary source of electrolyzer power is drawn directly from the vehicle battery 201 as well as from the alternator 203. FIG. 19(b) eliminates the electrical draw on the battery 201 by placing diode 202 between the alternator 203 and the battery 201. Diode 202 allows current flow from the alternator to the battery and other vehicle loads 205 but stops current flow from the battery to the electrolyzer 200. The current limiting circuit 206 protects the electrical system from over currents that could be drawn by the electrolyzer as the electrolyzer resistance changes. FIG. 19(c) is shown having an alternator 204 having an additional winding in which the magnetic circuit provides current limiting to the electrolyzer 200. This second winding would also allow higher voltages to be delivered to the electrolyzer 200, allowing the number of cells within the stack to be increased. FIG. 19(d) shows a system in which the vehicle alternating current is drawn from the alternator 207 before the vehicle regulator 209 and a separate current control/regulator 208 provides electrical power to the electrolyzer 200. This topology is able to current limit the electrolyzer load and provide higher voltages to the electrolyzer while using a conventional alternator.

The apparatus of the present invention, described above, may be operated in any number of ways as will be recognized by those in the art. One preferred mode of operating a system of the present invention, including an electrolyzer, is described in FIG. 20. The modes of operation for an ideal chemically heated catalyst ("CHC") a trademark of Lynntech, Inc., College Station, Texas, are: 1.) Pre-Start, which includes: safety monitoring, system status, and sleep; 2.) Start, which includes: system status, and converter temperature; 3.) Pre-Heat which includes: start air pump, release $H_2$ until a certain time, temperature, volume (pressure); safety monitoring, and system status; 4.) Rest which includes: safety monitoring and system status; 5.) Restore $H_2$ Supply, which includes: electrolyze, control current draw, safety monitoring, system status, and monitor the pressure and temperature; 6.) System Maintenance, which includes: recover cathode water, system status, and safety monitoring; and 7.) Return to Pre-Start the modes of operation for an ideal chemically heated catalyst (CHC, a trademark of Lynntech, Inc. of College Station, Tex.) system.

While the foregoing is directed to the preferred embodiment of the present invention, other and further embodiments of the invention may be devised without departing from the basic scope thereof. The scope of the invention is determined by the claims which follow.

What is claimed is:

1. A catalytic converter in the exhaust line of an internal combustion engine, comprising:
   a canister;
   a plurality of catalytic monoliths within the canister;
   a source of hydrogen;
   a gap between each of the plurality of monoliths; and
   means for introducing hydrogen from the source of hydrogen into the canister upstream of the plurality of monoliths and into the gap between each of the plurality of monoliths.

2. The catalytic converter of claim 1 wherein the means for introducing hydrogen comprises a manifold within the canister.

3. The catalytic converter of claim 1 wherein the means for introducing hydrogen comprises a manifold outside the canister.

4. A catalytic converter system for the exhaust of an internal combustion engine with an exhaust line, comprising:
   a catalytic converter in the exhaust line;
   a source of hydrogen;
   a conduit connecting the source of hydrogen to the exhaust line upstream of the catalytic converter;
   a source of oxygen;
   means for controlling the introduction of hydrogen from the source of hydrogen to the exhaust line;
   means for controlling the introduction of oxygen from the source of oxygen to the exhaust line, independent of the means for controlling the introduction of hydrogen;
   an isolation valve in the exhaust line upstream of the catalytic converter; and
   an isolation valve in the exhaust line downstream of the catalytic converter.

5. An apparatus comprising:
   a catalyst in the exhaust system of an internal combustion engine;
   a temperature sensor in thermal communication with the catalyst;
   an on-board electrolyzer for producing hydrogen and oxygen, wherein the electrolyzer is in communication with a hydrogen storage vessel and an oxygen storage vessel;
   a pressure sensor disposed in communication with the hydrogen storage vessel;
   a passage for communicating hydrogen from the hydrogen storage vessel to the catalyst, wherein the passage is free of an ignition source;
   a passage for communicating oxygen from the oxygen storage vessel to the catalyst;
   a flow control member disposed in the passage for controlling the delivery of hydrogen into the catalyst; and
   a controller for adjusting the flow control member to increase the catalyst temperature as indicated by the temperature sensor to a light-off temperature and adjusting the power to the electrolyzer when the pressure sensor indicates a setpoint pressure.

6. An apparatus comprising:
   a catalyst in the exhaust system of an internal combustion engine;
   a temperature sensor in thermal communication with the catalyst;
   an on-board electrolyzer for producing hydrogen, wherein the electrolyzer is in fluid communication with a hydrogen storage vessel;
   a pressure sensor disposed in communication with the hydrogen storage vessel;
   a passage for communicating hydrogen from the hydrogen storage vessel to the catalyst wherein the passage is free of an ignition source;
      a flow control member disposed in the passage for controlling the delivery of hydrogen into the catalyst;
      a controller for adjusting the flow control member to increase the catalyst temperature as indicated by the temperature sensor to a light-off temperature and adjusting the power to the electrolyzer when the pressure sensor indicates a setpoint pressure.

7. The apparatus of claim 6 wherein the power source is coupled to a battery and an automotive alternator.

8. The apparatus of claim 7 further comprising:
   (a) a diode placed in electronic communication between the battery and the alternator to prevent the flow of current from the battery to the electrolyzer; and
   (b) a current limiting circuit in electronic communication between the power source and the electrolyzer to protect the battery and electrolyzer from over currents.

9. The apparatus of claim 8 wherein the current limiting circuit comprises a magnetic circuit built into the alternator.

10. The apparatus of claim 7 further comprising a current control regulator separate from any vehicle regulator.

11. A method for controlling cold start emissions from the exhaust system of a combustion engine comprising the steps of :
   (a) starting the engine;
   (b) measuring an initial temperature of a catalyst in the exhaust system;
   (c) producing hydrogen and oxygen with an electrolyzer on board the vehicle;
   (d) storing the produced hydrogen in a first vessel and the oxygen in a second vessel;
   (e) delivering stored hydrogen to the catalyst;
   (f) delivering stored oxygen to the catalyst; and
   (g) heating the catalyst by exothermic catalytic combination of hydrogen and oxygen from the initial temperature up to a light-off temperature.

12. The method of claim 11 wherein hydrogen is released and allowed to diffuse in the catalyst before oxygen is released.

13. The method of claim 11 wherein the oxygen is released and allowed to diffuse in the catalyst before hydrogen is released.

14. A method comprising the steps of:
   (a) starting the engine;
   (b) measuring an initial temperature of a catalyst in the exhaust system;
   (c) producing hydrogen and oxygen with an electrolyzer on board the vehicle;
   (d) storing the produced hydrogen in a vessel;
   (e) delivering stored hydrogen to the catalyst;
   (f) providing a source of oxygen to the catalyst;
   (g) heating the catalyst by exothermic catalytic combination of hydrogen and oxygen from the initial temperature up to a light-off temperature; and
   (h) monitoring the pressure in the hydrogen storage cylinder and controlling the electrolyzer based on the pressure.

15. The method of claim 14 wherein pressure monitoring and electrolyzer operation are controlled by a controller on board the vehicle.

16. A method for controlling cold start emissions from the exhaust system of a combustion engine comprising the steps of:
   (a) starting the engine;
   (b) measuring an initial temperature of a catalyst in the exhaust system;
   (c) producing hydrogen on board the vehicle;
   (d) storing the produced hydrogen in a vessel
   (e) delivering stored hydrogen to the catalyst;
   (f) heating the catalyst by exothermic catalytic combination of hydrogen and oxygen from the initial temperature up to a light-off temperature; and
   (g) providing air into the catalyst, wherein the hydrogen is allowed to diffuse in the catalyst before air is provided.

17. A method for controlling cold start emissions from the exhaust system of a combustion engine comprising the steps of:
   (a) starting the engine;
   (b) measuring an initial temperature of a catalyst in the exhaust system;
   (c) producing hydrogen on board the vehicle;
   (d) storing the produced hydrogen in a vessel
   (e) delivering stored hydrogen to the catalyst;
   (f) heating the catalyst by exothermic catalytic combination of hydrogen and oxygen from the initial temperature up to a light-off temperature; and
   (g) providing air into the catalyst, wherein the air is allowed to diffuse in the catalyst before hydrogen is delivered to the catalyst.

* * * * *